United States Patent
Higashitani et al.

(10) Patent No.: US 10,589,234 B2
(45) Date of Patent: Mar. 17, 2020

(54) WET DISPERSER

(71) Applicant: OHKAWARA KAKOHKI CO., LTD., Kanagawa (JP)

(72) Inventors: Ko Higashitani, Kyoto (JP); Masaaki Ohkawara, Kanagawa (JP); Tomonao Ohkawara, Kanagawa (JP); Takayuki Tanaka, Seoul (JP); Toshiyuki Koganei, Kanagawa (JP)

(73) Assignee: OHKAWARA KAKOHKI CO., LTD. (JP)

( * ) Notice: Subject to any disclaimer, the term of this patent is extended or adjusted under 35 U.S.C. 154(b) by 62 days.

(21) Appl. No.: 15/870,212

(22) Filed: Jan. 12, 2018

(65) Prior Publication Data

US 2018/0193809 A1    Jul. 12, 2018

Related U.S. Application Data

(63) Continuation of application No. PCT/JP2016/070402, filed on Jul. 11, 2016.

(30) Foreign Application Priority Data

Jul. 16, 2015    (JP) .................. 2015-141951

(51) Int. Cl.
*B01F 3/12*    (2006.01)
*B01F 11/02*   (2006.01)
(Continued)

(52) U.S. Cl.
CPC .......... *B01F 3/1242* (2013.01); *B01F 3/0811* (2013.01); *B01F 3/0819* (2013.01);
(Continued)

(58) Field of Classification Search
CPC .............. B01F 11/2016; B01F 11/0258; B01F 2003/125; B01F 2215/0454; B01F 3/0811;
(Continued)

(56) References Cited

U.S. PATENT DOCUMENTS 2,124,580 A    12/1934    Lavine
2,333,456 A    11/1943    Wynn
(Continued)

FOREIGN PATENT DOCUMENTS

DE    4037665 A1    6/1992
GB    125721 A     8/1968
(Continued)

OTHER PUBLICATIONS

EP16824431.7 Extended Search Report dated Feb. 20, 2019; 7 Pgs.
PCT/JP2016/070402 International Search Report dated Oct. 3, 2016; 2 pgs.

*Primary Examiner* — Tony G Soohoo
(74) *Attorney, Agent, or Firm* — Bracewell LLP; Brad Y. Chin

(57) ABSTRACT

Embodiments provide a wet disperser for dispersing particulates in a mixture containing at least a dispersing medium and particulates. According to various embodiments, the wet disperser includes a through channel extending from an inflow port to an outflow port, and a mixture-passing plate having at least one passing hole defined. In the wet disperser, the through channel includes, on a downstream side of the through channel from a position provided with the mixture-passing plate, a dispersion part having a vibration body provided such that vibration causes at least a part of the vibration body to come into contact with at least a part of an opening periphery of the passing hole, and an inside surface defining the passing hole of the mixture-passing plate.

11 Claims, 15 Drawing Sheets

(51) Int. Cl.
*B01F 3/08* (2006.01)
*B01F 5/06* (2006.01)
*B01F 7/00* (2006.01)
*B02C 19/18* (2006.01)

(52) U.S. Cl.
CPC ............ *B01F 3/1271* (2013.01); *B01F 5/066* (2013.01); *B01F 5/0666* (2013.01); *B01F 7/00516* (2013.01); *B01F 11/0216* (2013.01); *B01F 11/0258* (2013.01); *B02C 19/18* (2013.01); *B01F 2003/125* (2013.01); *B01F 2215/0454* (2013.01)

(58) Field of Classification Search
CPC .... B01F 3/0819; B01F 3/1242; B01F 3/1271; B01F 5/066; B01F 5/0666; B01F 7/00516
See application file for complete search history.

(56) References Cited

U.S. PATENT DOCUMENTS

| | | | | |
|---|---|---|---|---|
| 3,329,347 | A * | 7/1967 | Montgomery | B05C 5/0225 239/583 |
| 3,738,578 | A * | 6/1973 | Farrell | F02M 51/0614 239/585.4 |
| 3,819,116 | A * | 6/1974 | Goodinge | F02M 61/162 239/102.2 |
| 3,865,312 | A * | 2/1975 | Lombard | F02M 51/005 239/585.1 |
| 4,018,419 | A * | 4/1977 | Monpetit | F16K 31/082 251/129.14 |
| 4,030,668 | A * | 6/1977 | Kiwior | F02M 51/005 239/585.4 |
| 4,142,683 | A * | 3/1979 | Casey | F02D 41/3005 123/470 |
| 4,166,577 | A * | 9/1979 | Elwell | F02M 69/041 239/102.2 |
| 4,306,683 | A * | 12/1981 | Mallinson | B05B 1/3053 239/585.2 |
| 4,308,890 | A * | 1/1982 | Saito | F02M 51/0632 137/495 |
| 4,354,640 | A * | 10/1982 | Hans | F02M 51/065 239/585.3 |
| 4,423,842 | A * | 1/1984 | Palma | F02M 51/005 239/585.4 |
| 4,423,843 | A * | 1/1984 | Palma | F02M 51/005 239/585.4 |
| 4,511,254 | A | 4/1985 | North et al. | |
| 4,531,679 | A * | 7/1985 | Pagdin | F02M 51/0632 239/585.1 |
| 4,585,176 | A * | 4/1986 | Kubach | F02M 51/0614 239/585.1 |
| 4,726,525 | A * | 2/1988 | Yonekawa | B05B 17/0623 239/102.2 |
| 4,982,902 | A * | 1/1991 | Knapp | F02M 51/065 239/585.3 |
| 5,004,165 | A | 4/1991 | Landa et al. | |
| 5,375,738 | A * | 12/1994 | Walsh | B05C 5/001 222/1 |
| 5,626,325 | A * | 5/1997 | Buchanan | F02M 57/023 137/539.5 |
| 5,801,106 | A * | 9/1998 | Jameson | D01D 5/098 428/400 |
| 5,803,106 | A * | 9/1998 | Cohen | F02M 69/041 137/13 |
| 5,868,153 | A * | 2/1999 | Cohen | G05D 7/0676 137/13 |
| 6,053,424 | A * | 4/2000 | Gipson | B05B 17/0623 137/13 |
| 6,378,502 | B1 * | 4/2002 | Betz | F02M 47/027 123/467 |
| 8,231,104 | B2 * | 7/2012 | Voss | F16K 31/0665 251/129.15 |
| 9,080,686 | B2 * | 7/2015 | Hoppe | F16K 31/082 |
| 2003/0042326 | A1 | 3/2003 | Jameson et al. | |
| 2006/0151899 | A1 | 7/2006 | Kato et al. | |
| 2008/0197218 | A1 | 8/2008 | Ishigaki et al. | |
| 2013/0340754 | A1 | 12/2013 | Donovan | |
| 2014/0255499 | A1 | 9/2014 | Vergnault et al. | |

FOREIGN PATENT DOCUMENTS

| | | |
|---|---|---|
| JP | H04503185 A | 6/1992 |
| JP | H05168888 A | 7/1993 |
| JP | H09313914 A | 12/1997 |
| JP | 2008200601 A | 9/2008 |
| WO | 2005013938 A1 | 2/2005 |
| WO | 2014004256 A1 | 1/2014 |

* cited by examiner

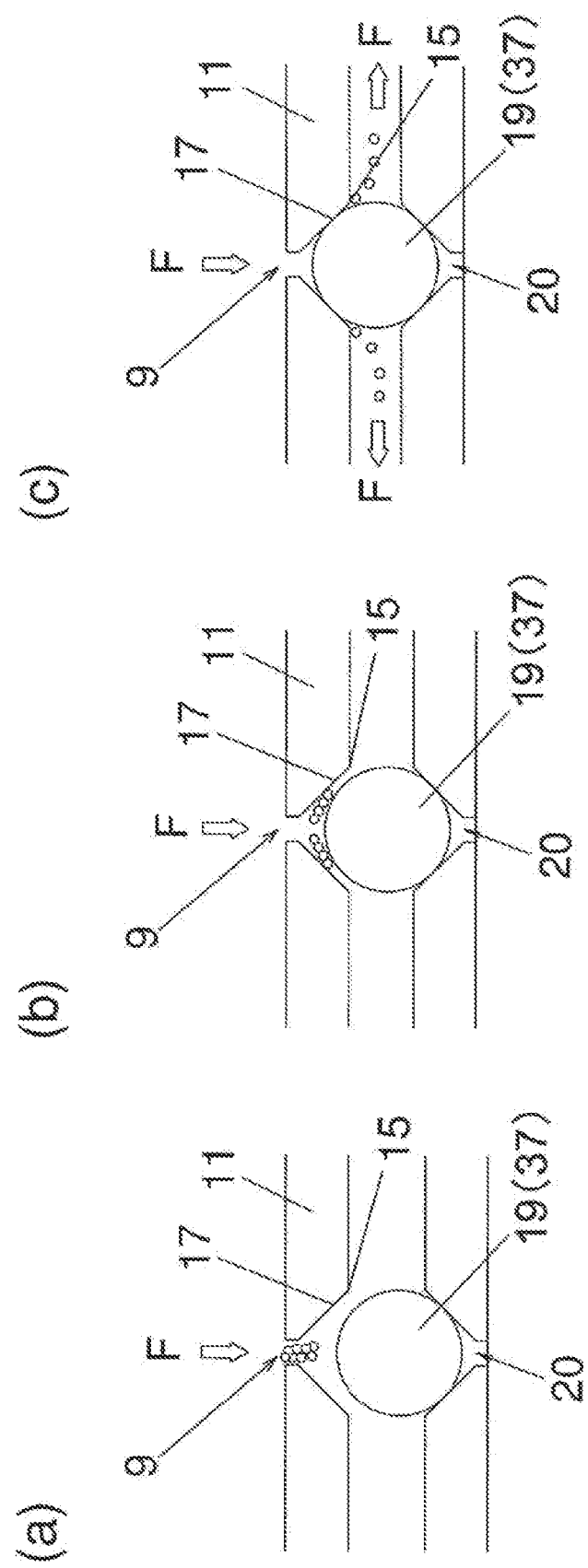

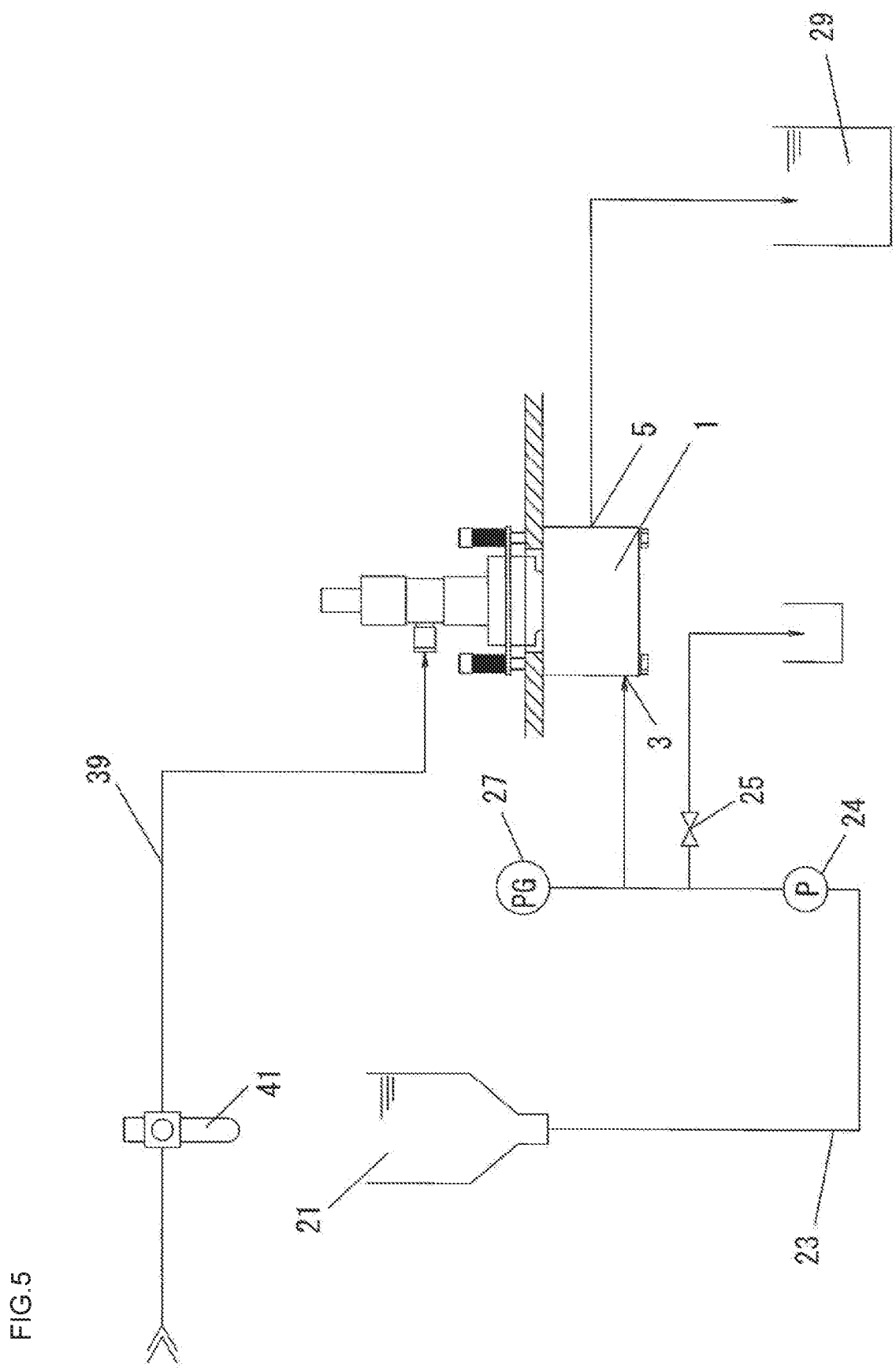

WET DISPERSER

CROSS REFERENCE TO RELATED APPLICATIONS

This application claims the benefit of and priority under 35 U.S.C. § 119 to PCT Patent Application No. PCT/JP2016/070402, entitled, "WET DISPERSER," filed on Jul. 11, 2016, which claims priority to Japanese Patent Application No. JP2015-141951, having the same title as the PCT patent application," filed on Jul. 16, 2015, each of which is hereby incorporated by reference in their entirety into this application.

BACKGROUND

Field

Embodiments of the invention relate to a wet disperser for dispersing particulates in a mixture containing at least a dispersing medium and at least one kind of particulates selected from a group consisting of a primary particle and an aggregate, which are contained in a mixture. More specifically, embodiments relate to a wet disperser that is almost free from contamination (mixing of a foreign matter) can uniformly disperse particulates in a short time, and can be operated while saving energy and space.

Description of the Related Art

Particulates having a median diameter of 1 to 500 nm are widely used as a functional material used for catalysts, catalyst carriers, conductive inks, sensors, luminescent materials, medical agents, and the like, or as an intermediate or a precursor of a functional material, as the particulates have a very large specific surface area and exhibit specific physical properties different from a bulk.

Control of a particle diameter of the particulates, control of a flocculation state of the particulates, control of a particle diameter distribution, and the like are important in order to effectively exhibit functions peculiar to the particulates (large specific surface area, physical properties different from a bulk, and the like). The control of the particle diameter distribution is to control the particle diameter of the particulates to be in a uniform state in a dispersion system.

Conventionally, dispersers such as a high speed rotation homogenizer, a high pressure homogenizer, a ball mill, a bead mill, and a jet mill have been used as a method of dispersing particulates in a dispersing medium.

However, in a method of dispersing particulates in a dispersing medium using a high speed rotation homogenizer, the particulates tend to aggregate in the dispersing medium, and there has been a case where it is not possible to perform control of a particle diameter of the particulates, control of a flocculation state, and control of a particle diameter distribution.

Further, when a high pressure homogenizer is used to disperse particulates in a dispersing medium, there has been a risk that the particulates are heated by high pressure and physical properties of the particulates are changed. For example, there is disclosed a method of producing ultrafine drug particles having an average particle diameter of 10 nm to 1000 nm obtained by emulsification treatment using the high pressure homogenizer at a treatment pressure of 3.5 to 275 MPa (See, for example, WO-A-2005/013938). However, the high pressure homogenizer used in the production method of WO-A-2005/013938 involves high energy consumption and requires a cooling work. This has posed a problem in that a large amount of energy is consumed, and a cooling facility or the like is required for the cooling work.

Further, in a method of dispersing particulates in a dispersing medium using a ball mill or a bead mill, beads are abraded due to contact between beads or the like, and there has been a case where a contamination problem occurs in which bead pieces generated by abrasion are mixed in a raw material. In addition, there has also been a problem that an operation time of the apparatus is long, and it is not possible to efficiently produce particulates. Moreover, in a method of dispersing particulates in a dispersing medium using a jet mill, high energy consumption has been a problem since the jet mill uses a high pressure gas.

Furthermore, in order to solve the above-mentioned problems, there has been disclosed a wet disperser that can perform advanced and uniform dispersion in a short time, and highly efficiently produces various kinds of products involving a particulate dispersion step, such as production of coating particles made by coating particulates as a base material (See, for example, JP-A-05-168888). In this wet disperser, particulates are divided and dispersed by passing through an orifice provided in a slurry-flow passage at an ultrahigh speed, and further, the particulates divided and dispersed are eroded and dispersed by ultrasonic waves. Therefore, the contamination problem due to contact and abrasion of beads as crushing media, like a bead mill and the like, hardly occurs, and energy consumption is also small.

SUMMARY

As shown in an example of JP-A-05-168888, the wet disperser of JP-A-05-168888 can disperse particulates of 1 µm to 10 µm, but it has been sometimes difficult to uniformly disperse nanoparticles having a median diameter of 1 to 500 nm mixed into the dispersing medium.

Embodiments of the invention have been made in view of such problems. According to at least one embodiment, there is provided a wet disperser for dispersing particulates in a mixture. The wet disperser according to at least one embodiment is capable of dispersion treatment almost without contamination, capable of dispersing particulates in a short time, and capable of controlling a particle diameter and a particle diameter distribution of the particulates to be constant. Further, the wet disperser according to at least one embodiment can disperse particulates in a dispersing medium in a short time. Further, since the wet disperser according to at least one embodiment does not require a cooling facility for performing a cooling work, the wet disperser can be installed in a narrow space. Furthermore, a complex flow field generated in a mixture containing at least a dispersing medium and particulates, that is, a contraction flow, a shear flow, an expansion flow, a vibration flow, and the like that have been mixed can be simultaneously used, and the particulates in the dispersing medium can be uniformly dispersed.

According to various embodiments, there is provided a wet disperser as discussed below.

According to at least one embodiment, there is provided a wet disperser for dispersing particulates in a mixture containing at least a dispersing medium and at least one kind of particulates selected from a group consisting of a primary particle and an aggregate, the wet disperser including: a through channel having an inflow port and an outflow port that serve as a through channel of the mixture and extending from the inflow port to the outflow port; and a mixture-passing plate provided in a middle of the through channel and having at least one passing hole defined, wherein the through channel includes, on a downstream side of the through channel from a position provided with the mixture-passing plate, a dispersion part having a vibration body provided such that vibration causes at least a part of the vibration body to come into contact with at least a part of an opening periphery of the passing hole, and an inside surface defining the passing hole of the mixture-passing plate.

According to at least one embodiment, the mixture-passing plate has a first surface having a small opening area of the passing hole and a second surface having an opening area of the passing hole larger than the opening area of the passing hole on the first surface; and the second surface side of the mixture-passing plate is arranged so as to be positioned on a side provided with the vibration body.

According to at least one embodiment, an opening area of the passing hole gradually increases in at least a part in a direction from the first surface toward the second surface.

According to at least one embodiment, vibration causes the vibration body to come into contact with at least a part of the inside surface.

According to at least one embodiment, a part of the vibration body is a curved surface, and vibration causes the curved surface to come into contact with at least a part of the inside surface.

According to at least one embodiment, the primary particle includes a particulate matter or a fibrous substance.

According to at least one embodiment, the particulates are dispersed as nanoparticles having a median diameter of 1 to 500 nm in a mixture after dispersion treatment.

According to at least one embodiment, the particulates are dispersed in a mixture after dispersion treatment as post-dispersion treatment particulates having a median diameter of 500 nm to 10 μm, or the particulates are dispersed in a mixture after dispersion treatment as nanofibers having a fiber diameter of 1 to 100 nm and a length of 100 times or more of the fiber diameter.

According to at least one embodiment, amplitude of the vibration body is 1 μm to 10 mm.

According to at least one embodiment, a vibration frequency of the vibration body is 0.1 to 10000 Hz.

According to at least one embodiment, the wet disperser further includes, in a part of the through channel, an ultrasonic wave generator on a downstream side from a part disposed with the dispersion part, and a frequency of the ultrasonic wave generator is 20 kHz to 10 MHz.

According to the wet disperser according to various embodiments, dispersion treatment of particulates can be performed almost without contamination in a short time while saving energy. Furthermore, since the complex flow field generated in the mixture containing at least a dispersing medium and particulates, that is, a contraction flow, a shear flow, an expansion flow, a vibration flow, and the like that have been mixed can be simultaneously used, a particle diameter of the particulates and a particle diameter distribution can be controlled to be constant. Furthermore, since the particulates do not become high temperature with the dispersion treatment as in conventional dispersion treatment with a high pressure homogenizer, there is almost no possibility that the physical properties of the particulates are changed, and a facility such as a cooling means for the particulates is unnecessary, enabling installation in a limited space. Further, since the wet disperser according to at least one embodiment can be operated in a short time while saving energy, it is excellent in productivity and workability.

Furthermore, according to at least one embodiment, it is also possible to allow the mixture containing at least particulates and the dispersing medium to pass through one wet disperser for a plurality of times depending on, for example, a flocculation state of the particulates. Further, in various embodiments, it is also possible to connect and use a plurality of wet dispersers in series. That is, in various embodiments, the mixture may pass through each of the wet dispersers connected in series in an order of a first wet disperser, a second wet disperser, and a third wet disperser. Further, the wet disperser according to at least one embodiment can be designed in various ways, such as by arranging a plurality of the wet dispersers in parallel to treat a large amount of a mixture.

Further, the wet disperser according to at least one embodiment can also be used for emulsification dispersion. That is, it is possible to obtain a uniform emulsion (post-dispersion treatment mixture), from a pre-dispersion treatment mixture containing at least a dispersing medium and a dispersoid both of which are liquid, and having been previously subjected to emulsification treatment with a homomixer or the like. The post-dispersion treatment mixture includes, for example, a mixture in which a dispersoid having an average particle diameter of a droplet of a dispersoid of 50 μm or less is dispersed in a dispersing medium. Here, "a droplet of a dispersoid" indicates a liquid phase of a dispersing medium whose entire surface is an interface between the dispersoid and the dispersing medium.

Further, the wet disperser according to at least one embodiment can also be used for dispersion or destruction of bio-cells such as microorganisms and cells.

Furthermore, the wet disperser according to at least one embodiment can crush an aggregate of a weakly consolidated particulate (solidified particulate) by sintering, coalescence, or the like. The solidified particulate is a particle that does not contain a molecule of an electrolyte and a flocculant between particles, and in which necking due to a chemical bond of a same composition grows and looks like an aggregated particle (aggregate).

BRIEF DESCRIPTION OF DRAWINGS

FIG. 1A is a vertical sectional view of a wet disperser, schematically showing a first embodiment of the wet disperser, in which a part of a through channel is seen through.

FIG. 1B is a vertical sectional view of the wet disperser, schematically showing the first embodiment of the wet disperser, in which a part of the through channel is seen through.

FIG. 1C is a plane view of FIG. 1A seen from a direction of an arrow X, in which a part of the through channel is seen through.

FIG. 1D is an explanatory view schematically showing a state where pre-dispersion treatment particulates in a pre-dispersion treatment mixture are dispersed by the wet disperser according to an embodiment.

FIG. 2A is an explanatory view schematically showing a configuration of a vibration body in the wet disperser according to an embodiment, in which a part of the through channel of the wet disperser is seen through.

FIG. 2B is an explanatory view schematically showing a configuration of the vibration body in the wet disperser according to an embodiment, in which a part of the through channel of the wet disperser is seen through.

FIG. 3 is a view schematically showing the wet disperser according to an embodiment, which is a vertical cross-sectional view of the wet disperser further including a preliminary dispersion means, in which a part of the through channel is seen through.

FIG. 4A is a vertical sectional view of a wet disperser, schematically showing a second embodiment of the wet disperser, in which a part of a through channel is seen through.

FIG. 4B is a plane view of FIG. 4A seen from a direction of an arrow X, in which a part of the through channel is seen through.

FIG. 5 is an explanatory diagram schematically showing dispersion treatment using the wet disperser according to an embodiment.

FIG. 7 is a view schematically showing the wet disperser according to an embodiment, which is a vertical cross-sectional view of the wet disperser further including a preliminary dispersion means, in which a part of the through channel is seen through.

FIG. 8A is a vertical sectional view of a wet disperser, schematically showing a third embodiment of the wet disperser, in which a part of a through channel is seen through.

FIG. 8B is a plane view of FIG. 8A seen from above, in which a part of the through channel is seen through.

FIG. 9A is an enlarged view schematically showing a region P2 shown in FIG. 8A, in which a part of the through channel of the wet disperser is seen through.

FIG. 9B is an enlarged view schematically showing the region P2 shown in FIG. 8A, in which a part of the through channel of the wet disperser is seen through.

FIG. 9C is an enlarged view schematically showing the region P2 shown in FIG. 8A, in which a part of the through channel of the wet disperser is seen through.

FIG. 9D is an enlarged view schematically showing the region P2 shown in FIG. 8A, in which a part of the through channel of the wet disperser is seen through.

FIG. 9E is an enlarged view schematically showing the region P2 shown in FIG. 8A, in which a part of the through channel of the wet disperser is seen through.

FIG. 9F is an enlarged view schematically showing the region P2 shown in FIG. 8A, in which a part of the through channel of the wet disperser is seen through.

FIG. 9G is an enlarged view schematically showing the region P2 shown in FIG. 8A, in which a part of the through channel of the wet disperser is seen through.

FIG. 9H is an enlarged view schematically showing the region P2 shown in FIG. 8A, in which a part of the through channel of the wet disperser is seen through.

DETAILED DESCRIPTION

Hereinafter, embodiments of the invention will be described, but the invention is not limited to the following embodiments. Therefore, it should be understood that the scope of the invention includes those in which changes, improvements, and the like are appropriately added to the following embodiments based on ordinary knowledge of a person skilled in the art, without departing from the spirit of the invention.

Figure 1A:
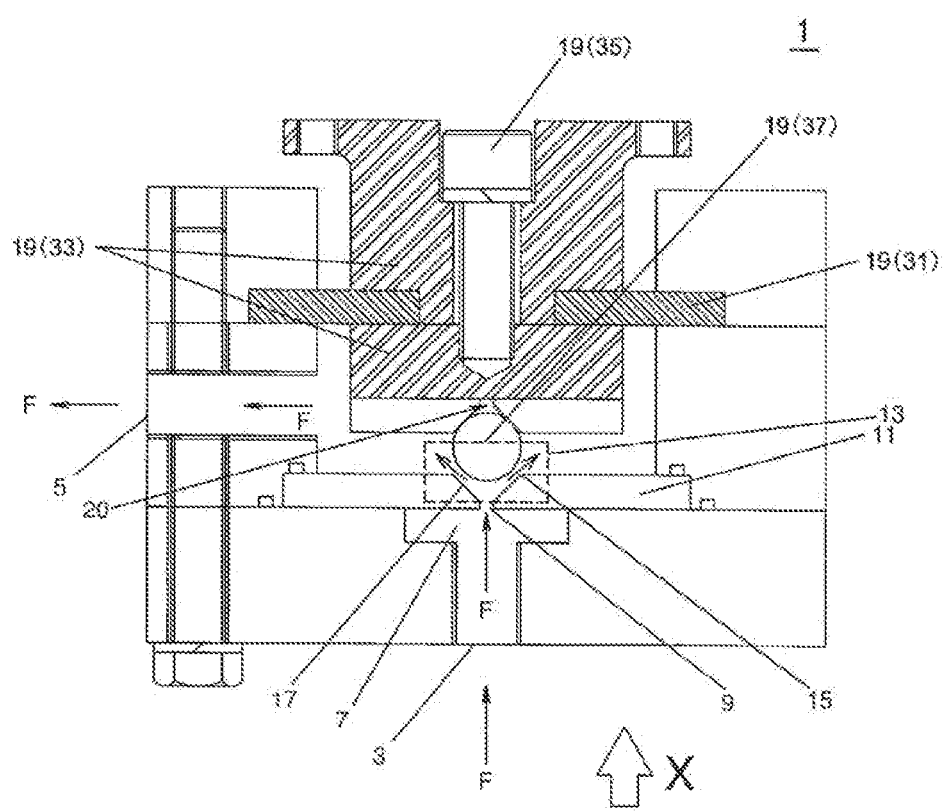
Figure 1B:
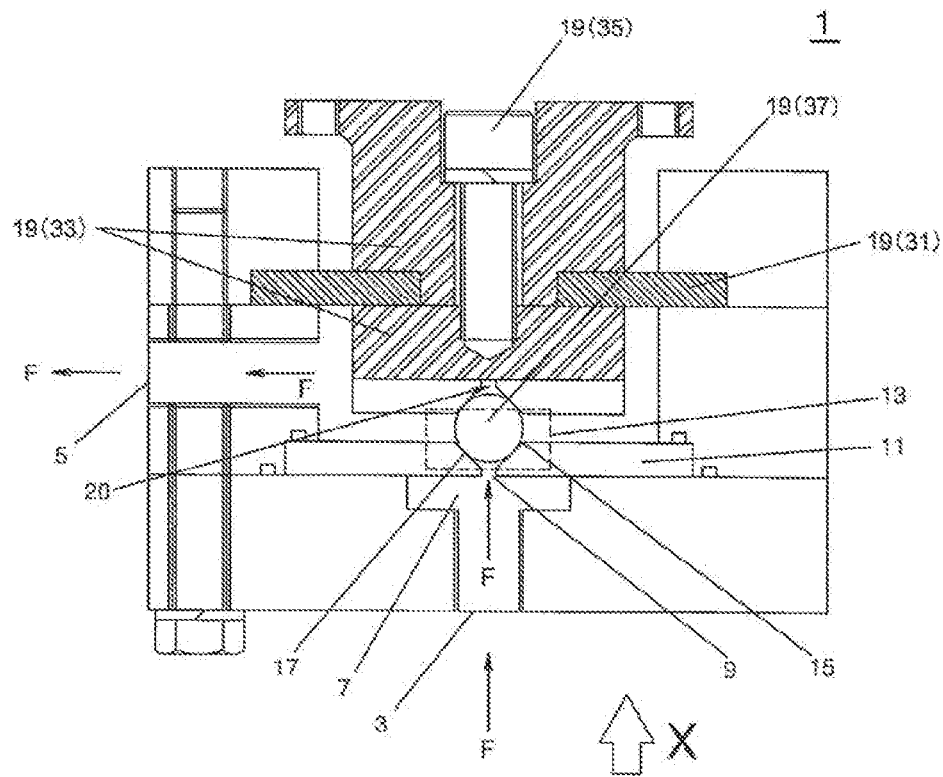
Figure 1C:
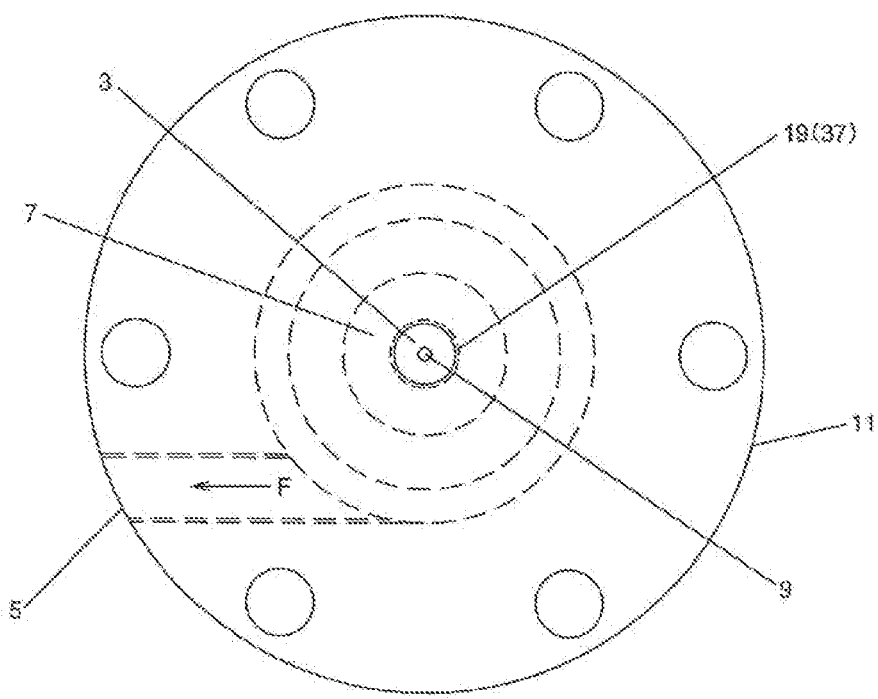

(1) Wet Disperser:

A wet disperser according to a first embodiment is a wet disperser 1 as shown in FIGS. 1A to 1D. FIG. 1A is a vertical sectional view of the wet disperser, schematically showing the first embodiment of the wet disperser, in which a part of a through channel is seen through. FIG. 1B is a vertical sectional view of the wet disperser, schematically showing the first embodiment of the wet disperser, in which a part of the through channel is seen through. FIG. 1C is a plane view of FIG. 1A seen from a direction of an arrow X, in which a part of the through channel is seen through. FIG. 1D is an explanatory view schematically showing a state where pre-dispersion treatment particulates in a pre-dispersion treatment mixture are dispersed by the wet disperser according to an embodiment.

As shown in FIGS. 1A to 1D, the wet disperser 1 of the first embodiment includes a through channel 7 having an inflow port 3 and an outflow port 5 that serve as the through channel 7 of a mixture and extending from the inflow port 3 to the outflow port 5, and a mixture-passing plate 11 that is provided in a middle of the through channel 7 and in which at least one passing hole 9 is defined. Further, the through channel 7 includes a dispersion part 13 on a downstream side of the through channel 7 from a position provided with the mixture-passing plate 11. In addition, the dispersion part 13 has a vibration body 19 provided such that vibration causes at least a part of the vibration body 19 to come into contact with at least a part of an opening periphery 15 of the passing hole 9, and an inside surface 17 defining the passing hole 9 of the mixture-passing plate 11. Note that, in FIGS. 1A to 1D, an arrow F indicates a flowing direction of the mixture.

Here, "vibration causes at least a part of the vibration body to come into contact with at least a part of the opening periphery of the passing hole, and the inside surface defining the passing hole of the mixture-passing plate" means the following. As shown in FIGS. 1A and 1B, by vibrating, contacting (FIG. 1B) and non-contacting (FIG. 1A) are repeated with at least a part of the opening periphery 15 of the passing hole 9, at least a part of the inside surface 17, or at least a part of the opening periphery 15 of the passing hole 9 and at least a part of the inside surface 17. Further, configuration may be such that, before starting of an operation of the wet disperser 1 (before vibrating of the vibration body), at least a part of the vibration body 19 comes into contact with at least a part of the opening periphery 15 of the passing hole 9, and at least a part of the inside surface 17 defining the passing hole 9 of the mixture-passing plate 11.

According to the wet disperser of at least one embodiment, it is possible to perform dispersion treatment of the particulates before the dispersion treatment, and to disperse the particulates after the dispersion treatment as nanoparticles or nanofibers in the dispersing medium in a short time almost without generating contamination. Hereinafter, particulates before dispersion treatment may be referred to as "pre-dispersion treatment particulates", while particulates after dispersion treatment of pre-dispersion treatment particulates may be referred to as "post-dispersion treatment particulates". In addition, when the post-dispersion treatment particulates are particulate matters having a median diameter of 1 to 500 nm, the post-dispersion treatment particulates may be referred to as "nanoparticles", while the post-dispersion treatment particulates may be referred to as "nanofibers" when the post-dispersion treatment particulates are fibrous substances having a fiber diameter of 1 to 100 nm and a length of more than 100 times of the fiber diameter. Further, "a mixture containing at least a dispersing medium and at least one kind of pre-dispersion treatment particulates selected from a group consisting of a primary particle and an aggregate" before the dispersion treatment may be referred to as a "pre-dispersion treatment mixture". Further, a mixture after dispersion treatment of the mixture may be referred to as a "post-dispersion treatment mixture". Further, post-dispersion treatment particulates and a post-dispersion treatment mixture indicate a mixture after pre-dispersion treatment particulates and the pre-dispersion treatment mixture pass through the wet disperser and are discharged from the outflow port. Moreover, particulates before the dispersion treatment, particulates during the dispersion treatment, and particulates after the dispersion treatment may be collectively referred to simply as "particulates". In addition, similarly, a mixture before the dispersion treatment, a mixture during the dispersion treatment, and a mixture after the dispersion treatment may be collectively referred to simply as a "mixture".

As shown in FIGS. 1A to 1D, the wet disperser 1 includes the through channel 7 and the mixture-passing plate 11, and the through channel 7 includes the dispersion part 13 having the vibration body 19. The mixture after passing through the mixture-passing plate 11 flows into the dispersion part 13 having the vibration body 19. Thereafter, the vibration body 19 gives a complex flow field to the mixture. By an action of this complex flow field, the particulates in the mixture are dispersed in the dispersing medium as particulates having a fixed particle diameter and a particle diameter distribution. Note that, in FIGS. 1A to 1D, reference numeral 31 denotes a rubber plate (vibration body), reference numeral 33 denotes a piston (vibration body), reference numeral 35 denotes a vibrator (vibration body), and reference numeral 37 denotes a spherical vibration element (vibration body).

The vibration body 19 of the wet disperser 1 according to at least one embodiment is provided such that vibration causes at least a part of the vibration body 19 to come into contact with at least a part of the opening periphery 15 of the passing hole 9, and the inside surface 17 defining the passing hole 9 of the mixture-passing plate 11. Hereinafter, "the vibration body is provided such that at least a part of the vibration body comes into contact with at least a part of the opening periphery of the passing hole, and the inside surface defining the passing hole of the mixture-passing plate" may be described as "the vibration body is provided so as to come into contact with the passing hole". Further, "at least a part of the vibration body is in contact with at least a part of the opening periphery of the passing hole, and the inside surface defining the passing hole of the mixture-passing plate" may be described as "the vibration body is in contact with the passing hole". Since the vibration body 19 vibrates so as to repeat contacting and non-contacting with the passing hole 9, when the vibration body 19 is in contact with the passing hole 9, a gap between the vibration body 19 and the passing hole 9 is minimized, and an amount of the mixture flowing through the dispersion part 13 (through channel 7) is reduced. On the other hand, when the vibration body 19 is in non-contact with the passing hole 9, the amount of the mixture flowing through the dispersion part 13 (through channel 7) is increased as compared with when the vibration body 19 is in contact with the passing hole 9.

Here, referring now to FIG. 1D, the complex flow field given by the vibration body 19 will be described in detail. First, as shown in (a) of FIG. 1D, the pre-dispersion treatment mixture flows into between the vibration body 19 and the passing hole 9. Subsequently, as shown in (b) of FIG. 1D, the vibration body 19 vibrates in a direction coming into contact with the passing hole 9, which gives the complex flow field to the mixture, and reduces the particle diameter of the particulates in the mixture. As shown in (c) of FIG. 1D, when the gap formed between the vibration body 19 and the passing hole 9 is minimized (i.e., the vibration body 19 is in contact with the passing hole 9), the complex flow field is given and the particulates having a reduced particle diameter are discharged to a downstream side from the vibration body while the particle diameter is further reduced. With such a configuration, the complex flow field is given to the mixture by the vibration body 19. That is, the contact between the vibration body 19 and the passing hole 9 is exclusively performed to give such a complex flow field to the mixture. It is not aimed at, for example, grinding the particulates by sandwiching the particulates between the vibration body 19 and the passing hole 9 or the like. It should be noted that a very small part of the particulates may be accidentally ground by being sandwiched between the vibration body 19 and the passing hole 9 or the like.

The wet disperser according to at least one embodiment having the above-described configuration is not to disperse pre-dispersion treatment particulates using crushing media as used in a conventional ball mill or bead mill. Therefore, a force for moving the vibration body in the wet disperser of an embodiment is much smaller than a force for moving the crushing media of the conventional ball mill and bead mill. Therefore, as compared with the conventional ball mill and bead mill, a crushing media piece generated by abrasion of the vibration body is less likely mixed (contamination) into the post-dispersion treatment mixture. Moreover, in the wet disperser according to at least one embodiment, it is not necessary to use a high pressure gas or the like as in a conventional wet disperser such as a jet mill, a high pressure homogenizer, and the like. Therefore, the wet disperser does not require large energy, and can be operated while saving energy. Furthermore, in the wet disperser according to at least one embodiment, since the post-dispersion treatment particulates do not become high temperature with the dispersion treatment as in conventional dispersion treatment of a mixture with a high pressure homogenizer, there is almost no possibility that physical properties of the particulates are changed, and a facility or the like for cooling the particulates is unnecessary, enabling installation in a limited space.

In the wet disperser according to at least one embodiment, an opening area on an upstream side of one passing hole defined in the mixture-passing plate is not particularly limited. However, from viewpoint of machining the mixture-passing plate, the opening area on the upstream side of the passing hole is preferably 0.79 mm$^2$ or more.

The inflow port of the pre-dispersion treatment mixture is not particularly limited as long as it has a shape or a structure that facilitates easy introduction of the mixture before dispersion treatment into the wet disperser, and any known inflow port can be used. Further, the outflow port of the post-dispersion treatment mixture is not particularly limited as long as it has a shape or a structure that facilitates discharge of the post-dispersion treatment mixture to outside the wet disperser, and any known outflow port can be used.

The wet disperser according to at least one embodiment is configured such that, among through channel diameters in the entire through channel through which the mixture passes, a through channel diameter at "the opening periphery of the passing hole defined in the mixture-passing plate, and the gap formed between the vibration body and the inside surface defining the passing hole" is the narrowest. Hereinafter, "the opening periphery of the passing hole defined in the mixture-passing plate, and the gap formed between the vibration body and the inside surface defining the passing hole" may be referred to as a "gap". Then, when the mixture passes through the gap, a speed of the mixture becomes the fastest in the entire through channel (a flow rate of the mixture is the maximum speed). The speed of the mixture passing through the gap can be, for example, 50 to 5000 cm/s. As the speed of the mixture passing through the gap increases, the dispersion degree of the particulates can be increased. If the speed of the mixture passing through the gap is slower than 50 cm/s, the dispersion degree of particulates may decrease. If the speed of the mixture passing through the gap is higher than 5000 cm/s, pressure required to deliver the mixture may increase. It is sometimes difficult to obtain a liquid supply pump that can deliver liquid at a high pressure. The speed of the mixture passing through the gap can be determined, for example, as follows.

First, a liquid feeding pressure F1 at the inflow port of the wet disperser is measured using a Bourdon tube type pressure gauge. Thereafter, using the measured liquid feeding pressure F1, a speed of the mixture after passing through the gap is determined from the Bernoulli's equation. Then, this speed is taken as a speed of the mixture "passing through" the gap. In determining the speed of the mixture passing through the gap, pure water containing 5 mass % of REOLOSIL QS-102 manufactured by Tokuyama Corporation, for example, can be used as the mixture.

There is no particular limitation on the liquid feeding pressure for feeding the pre-dispersion treatment mixture from the inflow port to the through channel.

While a material of the wet disperser is not particularly limited as long as it has sufficient corrosion resistance to the pre-dispersion treatment mixture (post-dispersion treatment mixture), for example, ceramics, iron, stainless steel, acrylic resin, and the like are preferable.

In the wet disperser according to at least one embodiment, the mixture-passing plate preferably has a first surface having a small opening area of the passing hole and a second surface having an opening area of the passing hole larger than the opening area of the passing hole on the first surface. Further, the second surface side of the mixture-passing plate is preferably arranged so as to be positioned on a side provided with the vibration body (downstream side of the through channel).

In the wet disperser according to at least one embodiment, the opening area of the passing hole preferably gradually increases in at least a part in a direction from the first surface toward the second surface of the mixture-passing plate. With such a configuration, it is possible to stably vibrate the vibration body described later. Hereinafter, a shape of the passing hole, which is defined such that the opening area of the passing hole gradually increases in at least a part in a direction of the mixture-passing plate from the first surface toward the second surface, may be referred to as an "orifice shape".

A shape of a cross section, of an open end of the passing hole, perpendicular to a flowing direction of the pre-dispersion treatment mixture can be circular. When the shape of the cross section, of the open end of the passing hole, perpendicular to the flowing direction of the pre-dispersion treatment mixture is circular, a diameter of the open end of the passing hole can be set to 0.5 to 10 mm. If the diameter of the open end of the passing hole is too small, it is difficult for the pre-dispersion treatment mixture to pass through the passing hole, and an amount of the pre-dispersion treatment mixture that can be subjected to dispersion treatment may decrease. Further, if the diameter of the open end of the passing hole is too large, the vibration body also needs to be enlarged, which may increase in size of the wet disperser. In addition, since a large amount of energy is required to vibrate the vibration body when the vibration body is enlarged, operation cost may increase. Moreover, if the shape of the cross section, of the open end of the passing hole, perpendicular to the flowing direction of the pre-dispersion treatment mixture is not circular, the diameter of the open end is determined by converting into a hydraulic diameter.

In the wet disperser according to at least one embodiment, it is preferable that vibration causes the vibration body to come into contact with a part of the inside surface of the passing hole defined in the mixture-passing plate.

In the vibration body of the wet disperser according to at least one embodiment, it is preferable that a part of the vibration body is a curved surface, and vibration causes this curved surface to come into contact with at least a part of the inside surface of the passing hole defined in the mixture-passing plate. Moreover, it is more preferable that at least a part of the shape of the vibration body is a sphere, an ellipsoid, a cone, a part of a sphere, a part of an ellipsoid, or a truncated cone, and at least a part of the curved surface of these solid bodies comes into contact with at least a part of the inside surface of the passing hole defined in the mixture-passing plate. With this configuration, even when a design accuracy regarding a position for disposing the vibration body with respect to the passing hole is not high, the curved surface of the vibration body can be stably brought into contact with at least a part of the inside surface of the passing hole. Further, with such a configuration, even when a vibration axis of the vibration body is not constant (in other words, even when the vibration body vibrates three-dimensionally), the curved surface of the vibration body can be stably brought into contact with at least a part of the inside surface of the passing hole.

In the vibration body of the wet disperser according to at least one embodiment, the vibration body itself may be constituted by a vibrator or the like, or vibration of a vibrator or the like propagates to the vibration body to vibrate. In addition, configuration may be such that a liquid supply pump that generates pulsation may be used in supplying the pre-dispersion treatment mixture to the wet disperser of the present embodiment, and the pulsation of the liquid supply pump propagates to the vibration body to vibrate the vibration body.

Figure 2A:
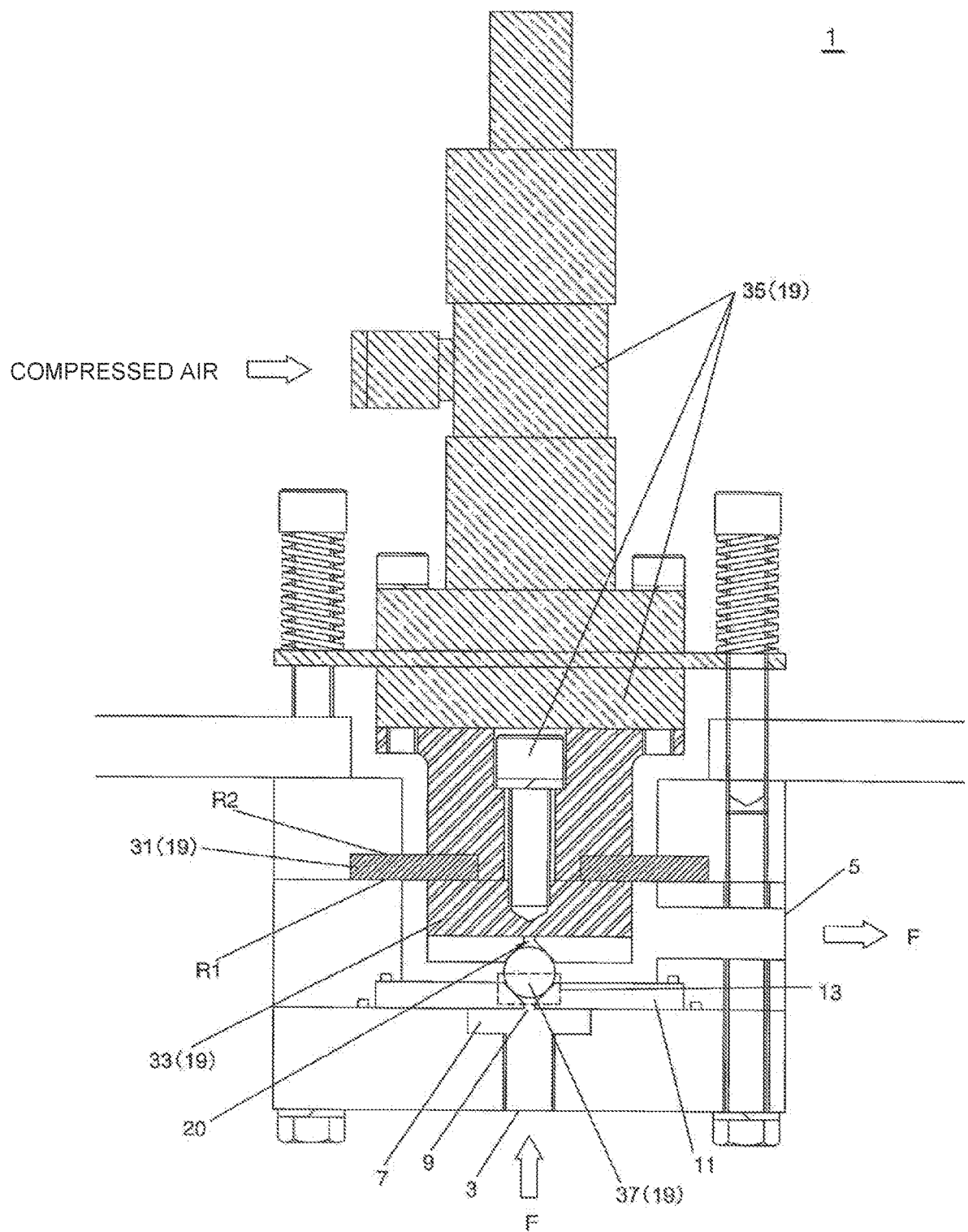
Figure 2B:
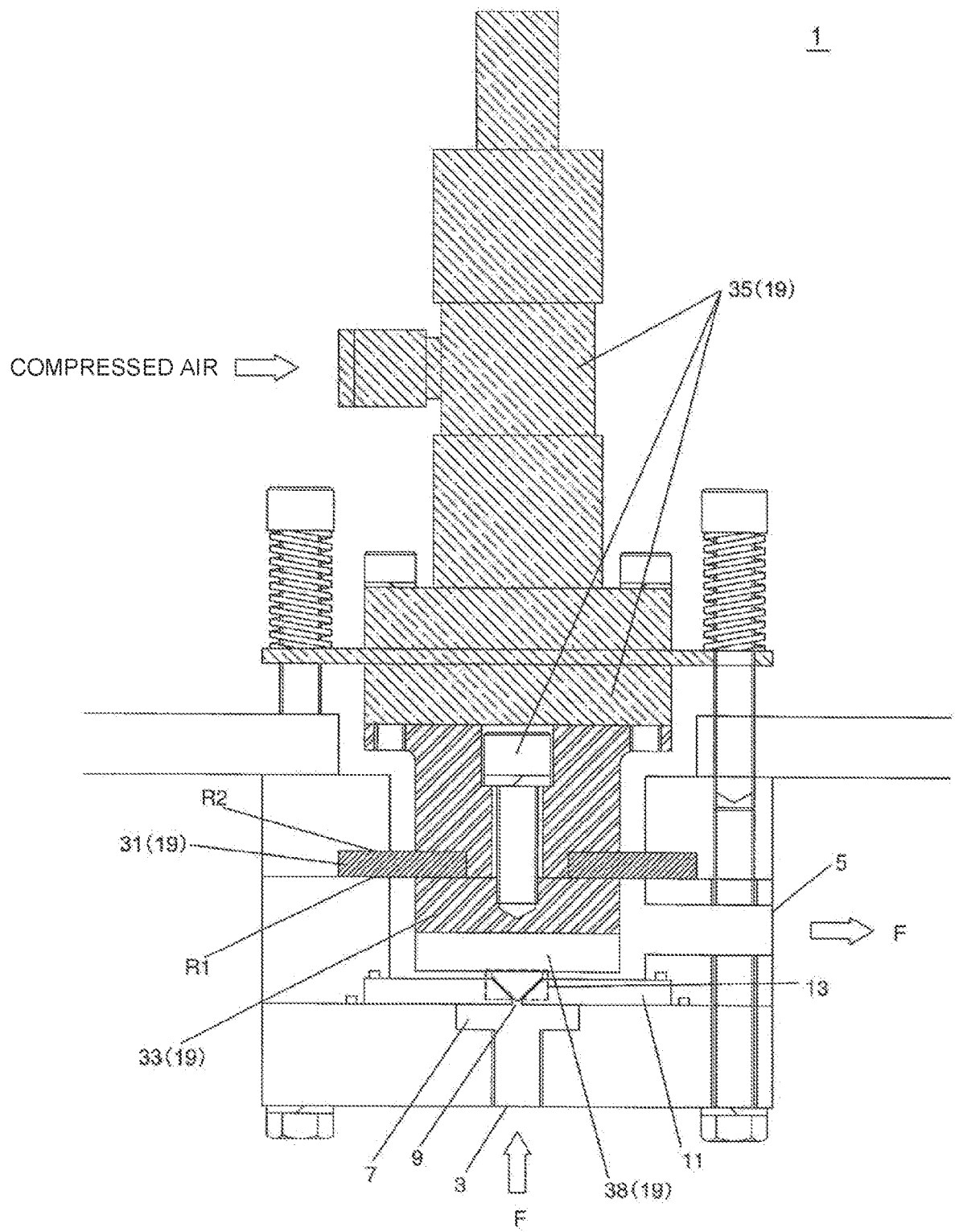

In the wet disperser according to at least one embodiment, while a mechanism to vibrate the vibration body is not particularly limited, a mechanism to vibrate the vibration body as shown in FIGS. 2A and 2B, for example, can be suitably adopted.

According to at least one embodiment, the vibration body 19 shown in FIG. 2A is the vibration body 19 having a rubber plate 31 that is an elastic body, a piston 33 provided so as to sandwich a first surface R1 and a second surface R2 of the rubber plate 31, the spherical vibration element 37 arranged below the piston 33, and a vibrator 35. As such a vibrator 35, it is possible to suitably use an air vibrator or the like of a piston vibration mechanism, in which vibration can be adjusted by adjusting pressure of supply air. The vibration body 19 vibrates so as to repeat contacting and non-contacting of at least a part of the spherical vibration element 37 with at least a part of the opening periphery 15 of the passing hole 9, and the inside surface 17 defining the passing hole 9 of the mixture-passing plate 11.

Here, when the vibration body 19 as shown in FIG. 2A is adopted, it is preferable to form a holding recess 20 for spherical vibration element on the piston 33, and to arrange the spherical vibration element 37 so as to be sandwiched between the holding recess 20 for spherical vibration element and the inside surface 17 defining the passing hole 9. With such a configuration, the spherical vibration element 37 vibrates so as to repeat contacting and non-contacting with at least a part of an opening periphery of the holding recess 20 for spherical vibration element and an inside surface defining the holding recess 20 for spherical vibration element. Therefore, the vibration of the vibration body 19 generates a complex flow field in the mixture also in the holding recess 20 for spherical vibration element.

According to at least one embodiment, the vibration body 19 shown in FIG. 2B is the vibration body 19 having the rubber plate 31 that is an elastic body, the piston 33 provided so as to sandwich the first surface R1 and the second surface R2 of the rubber plate 31, a vibration element 38 arranged below the piston 33, and the vibrator 35. At least a part of the shape of the vibration element 38 is a cone or a truncated cone. Hereinafter, "a portion of the vibration element 38, which has a cone or a truncated cone" may be referred to as a "conical portion". The vibration body 19 vibrates so as to repeat contacting and non-contacting of at least a part of a side surface of the conical portion with at least a part of the opening periphery 15 of the passing hole 9, and the inside surface 17 defining the passing hole 9 of the mixture-passing plate 11. In a case of such a configuration, it is possible to reduce pressure fluctuation of the pre-dispersion treatment mixture at the inflow port 3. A shape of the conical portion may be such a shape that at least a part of the side surface of the conical portion comes into line contact or surface contact with at least a part of the opening periphery 15, and the inside surface 17 defining the passing hole 9 of the mixture-passing plate 11. Moreover, the shape of the conical portion can also be such a shape that at least a part of the side surface of the conical portion comes into surface contact with at least a part of the inside surface 17 defining the passing hole 9 of the mixture-passing plate 11. In a case of such a configuration, it is also possible to further reduce pressure fluctuation of the pre-dispersion treatment mixture at the inflow port 3.

When the vibration body 19 as shown in FIG. 2B is adopted, and the shape of the conical portion is such a shape that at least a part of the side surface of the conical portion comes into surface contact with at least a part of the inside surface 17 defining the passing hole 9 of the mixture-passing plate 11, the conical portion can also be configured as follows. That is, the conical portion can also be formed with a groove at a portion that is at least a part of the side surface of the conical portion, and comes into surface contact with at least a part of the inside surface 17 defining the passing hole 9 of the mixture-passing plate 11. The groove can be formed, for example, so as to start from one point on the side surface of the conical portion, pass through the side surface of the conical portion, and end at one point on the side surface of the conical portion. When such a groove is formed, a flow rate of the mixture changes as the mixture passes through the groove, creating a complex flow field in the mixture. A width, a shape, and a number of the groove are not particularly limited. Further, the groove may be continuously formed or may not be continuously formed. For example, the groove can be formed so as to be a dotted line starting from one point on the side surface of the conical portion, passing through the side surface of the conical portion, and ending at one point on the side surface of the conical portion.

In the wet disperser according to at least one embodiment, it is preferable that the primary particles as the pre-dispersion treatment particulates contain a particulate matter or a fibrous substance. Further, the primary particles are preferably aggregates of a crystallite of single crystal or a crystallite close to single crystal, and a median diameter is preferably 1 to 500 nm. It is preferable that the aggregates are obtained from aggregation of several to several thousands of primary particles having a median diameter of 1 to 500 nm with Van der Waals force, Coulomb force, or the like.

In the wet disperser according to at least one embodiment, the pre-dispersion treatment particulates can be dispersed in the dispersing medium (in the post-dispersion treatment mixture) as nanoparticles having a median diameter of 1 to 500 nm (post-dispersion treatment particulates). The nanoparticles are primary particles having a median diameter of 1 to 500 nm, and aggregates having a median diameter of 1 to 500 nm obtained from aggregation of the primary particles having a median diameter of 1 to 500 nm.

In the wet disperser according to at least one embodiment, the pre-dispersion treatment particulates having a median diameter of several hundred μm to several mm can also be dispersed in the dispersing medium (in the post-dispersion treatment mixture) as post-dispersion treatment particulates having a median diameter of 500 nm to 10 μm. That is, the wet disperser of the present embodiment can well disperse even when an average particle diameter before treatment (an aggregated particle diameter of aggregated primary particles) is large. On the other hand, for example, in a high pressure homogenizer, when a particle diameter before treatment is large, particles may be clogged in the through channel to disable operation. As described above, the wet disperser of the present embodiment can disperse the pre-dispersion treatment particulates without causing clogging.

In the wet disperser according to at least one embodiment, when the pre-dispersion treatment particulates are aggregates of nanofibers, the pre-dispersion treatment particulates can also be dispersed in the dispersing medium (in the post-dispersion treatment mixture) as nanofibers having a fiber diameter of 1 to 100 nm and a length of 100 times or more of the fiber diameter, by dissociating at least a part of aggregation (entanglement) of the nanofibers.

Further, the wet disperser according to at least one embodiment can also be used for emulsification dispersion. That is, from a pre-dispersion treatment mixture containing at least a dispersing medium and a dispersoid both of which are liquid, and having been previously subjected to emulsification treatment with a homogenizer or the like, it is possible to obtain a uniform emulsion (post-dispersion treatment mixture), for example, in which the dispersoid having an average particle diameter of a droplet of the dispersoid of 50 μm or less is dispersed in the dispersing medium. It should be noted that preliminary emulsification (performing emulsification treatment in advance) is not always necessary, and it is also possible to similarly obtain a uniform emulsion even from a liquid containing the dispersing medium and the dispersoid and having been simply mixed with a stirring rod or the like (emulsification is not performed in this state). Here, "a droplet of a dispersoid" indicates a liquid phase of a dispersing medium whose entire surface is an interface between the dispersoid and the dispersing medium. As a case of using for emulsification dispersion includes, for example, synthesis of latex particles.

Amplitude of the vibration body in the wet disperser according to at least one embodiment is preferably 1 μm to 10 mm. The amplitude of the vibration body is amplitude of the vibration body in a direction perpendicular to the mixture-passing plate. Further, the vibration body may vibrate in two perpendicular axial directions with respect to the direction perpendicular to the mixture-passing plate. When the direction perpendicular to the mixture-passing plate is an x axis, the two perpendicular axial directions with respect to the direction perpendicular to the mixture-passing plate indicate a y axis perpendicularly crossing with the x axis, and a z axis perpendicularly crossing with both the x axis and the y axis.

A vibration frequency of the vibration body in the wet disperser according to at least one embodiment is preferably 0.1 to 10000 Hz. The vibration frequency of the vibration body is a vibration frequency of the vibration body in a direction perpendicular to the mixture-passing plate.

In the wet disperser according to at least one embodiment, it is also preferable to have a preliminary dispersion means on an upstream side of the vibration body. Providing the preliminary dispersion means allows control of the flow of the mixture, and increase in the dispersion degree of the particulates.

Figure 3:
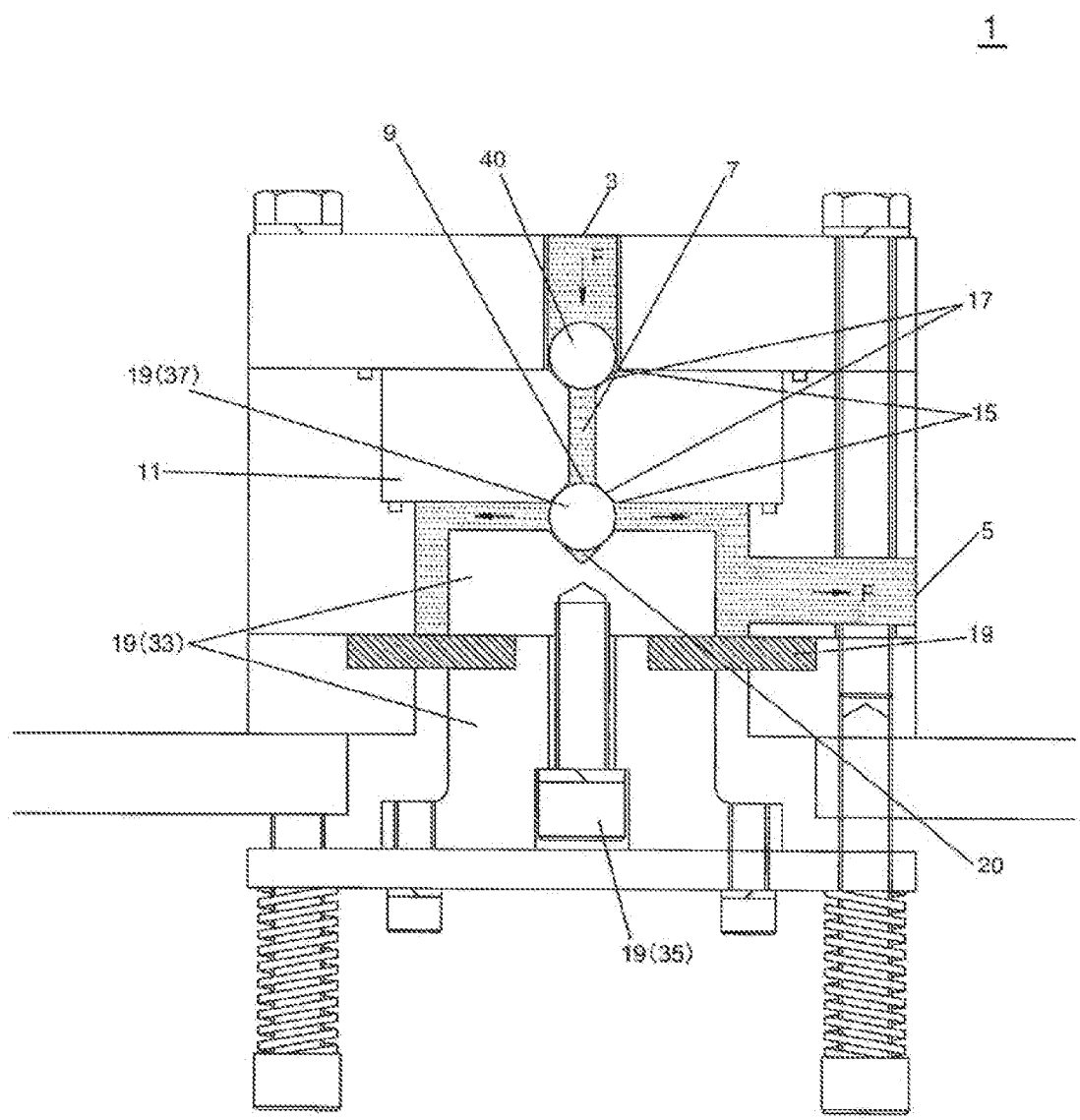

The preliminary dispersion means can be configured, for example, as shown in FIG. 3. Here, FIG. 3 is a view schematically showing the wet disperser according to at least one embodiment, which is a vertical cross-sectional view of the wet disperser further including the preliminary dispersion means, in which a part of the through channel is seen through. The preliminary dispersion means shown in FIG. 3 is configured as follows. The through channel 7 includes a preliminary dispersion vibration element 40, on an upstream side of the through channel 7 from a position provided with the mixture-passing plate 11. The preliminary dispersion vibration element 40 is provided such that at least a part of the preliminary dispersion vibration element 40 comes into contact with at least a part of the opening periphery 15 of the passing hole 9, and the inside surface 17 defining the passing hole 9 of the mixture-passing plate 11. A shape of at least a part of the preliminary dispersion vibration element 40 is preferably a sphere, an ellipsoid, a cone, a part of a sphere, a part of an ellipsoid, or a truncated cone, and at least a part of the curved surface of these solid bodies preferably comes into contact with at least a part of the inside surface 17 of the passing hole 9 defined in the mixture-passing plate. In addition, the preliminary dispersion vibration element 40 may be configured similarly to the above-described spherical vibration element or vibration element. As shown in FIG. 3, the wet disperser according to at least one embodiment is provided with, under the preliminary dispersion vibration element 40, a dispersion ring that is a ring-shaped member and narrows the through channel to promote a dispersion action of the pre-dispersion treatment mixture. To this dispersion ring, there is formed a through hole or the like through which the pre-dispersion treatment mixture flows.

Figure 7:
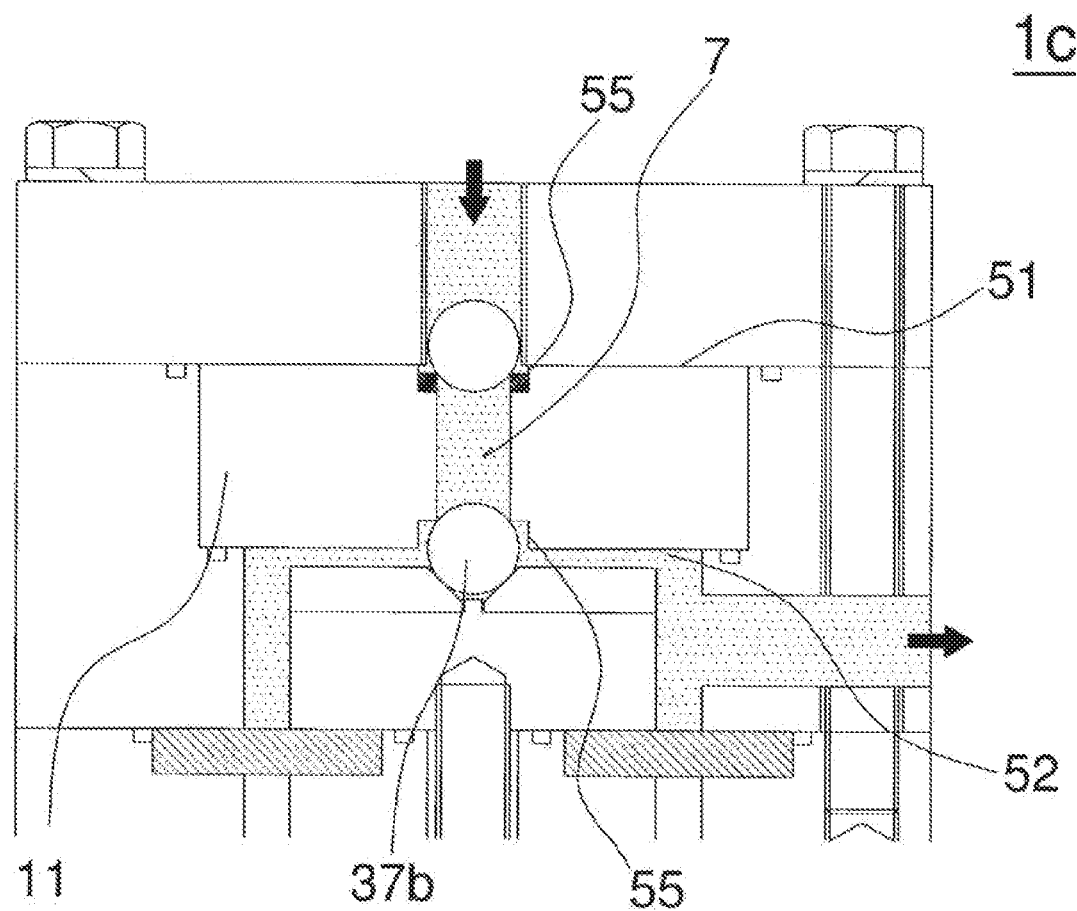

When the wet disperser further includes the preliminary dispersion means, the mixture-passing plate is preferably configured as follows. The mixture-passing plate has a first surface that is a surface on an upstream side of the through channel, and a second surface that is a surface on a downstream side of the through channel. In the mixture-passing plate, the opening area of the passing hole may decrease stepwise in a part in a direction from the first surface toward the second surface as compared with the "opening area of the passing hole of the first surface", and the opening area of the passing hole may increase stepwise in a part in a direction from the first surface toward the second surface. This aspect includes, for example, a case where the stepped portion 55 is formed on each of a first surface 51 side and a second surface 52 side as in the wet disperser 1c shown in FIG. 7, and the like. In addition, the opening area of the passing hole of the first surface and the opening area of the passing hole of the second surface may be the same or different. Further, a shape of the passing hole may be defined in "orifice/reverse-orifice shape". "Orifice/reverse-orifice shape" indicates a shape in which the opening area of the passing hole gradually decreases in a part of the mixture-passing plate in a direction from the first surface toward the second surface, and the opening area of the passing hole gradually increases in a part in a direction from the first surface toward the second surface. Note that, in FIG. 3, the passing hole is defined to be "orifice/reverse-orifice shape". The wet disperser 1c shown in FIG. 7 shows a modified example of the wet disperser 1b shown in FIG. 3, showing a case where the shape of the passing hole (through channel 7) in the mixture-passing plate 11 is different.

When the passing hole is defined to be the "orifice/reverse-orifice shape", in other words, when "defined to be a funnel/inverted-funnel shape", or, when "defined to be an inverted truncated cone/truncated cone shape", the wet disperser can also be configured as follows. That is, a groove can be formed, on the inside surface of the passing hole, at a portion defined to be an orifice (i.e., a portion defined to be a funnel shape or a portion defined to be an inverted truncated cone shape). For example, on the inside surface of the passing hole, there may be formed a plurality of grooves that are to be a generatrix of a portion defined to be the orifice (i.e., a portion defined to be a funnel shape or a portion defined to be an inverted truncated cone shape).

In the wet disperser according to at least one embodiment, it is also preferable to have an ultrasonic wave generating means on a downstream side of the vibration body. Providing such an ultrasonic wave generating means can prevent reaggregation of the post-dispersion treatment particulates in the post-dispersion treatment mixture. While the post-dispersion treatment particulates tend to easily reaggregate in the dispersing medium, applying ultrasonic vibration to the post-dispersion treatment mixture with such an ultrasonic wave generating means can prevent reaggregation of the post-dispersion treatment particulates. Furthermore, even when post-dispersion treatment particulates not sufficiently dispersed are present in the post-dispersion treatment mixture, the ultrasonic wave generating means can sufficiently disperse the post-dispersion treatment particulates not sufficiently dispersed. While the ultrasonic wave generating means is not particularly limited, and known ultrasonic wave generating means can be used, it is preferable to include an ultrasonic wave transmitting part and an ultrasonic generating horn disposed in the through channel through which the post-dispersion treatment mixture flows. Further, it is preferable that the ultrasonic transmission part can control generated ultrasonic waves, and that a frequency of the ultrasonic wave is 20 kHz to 10 MHz. Furthermore, in order to sufficiently give vibration to the post-dispersion treatment mixture with the ultrasonic wave generating means, a space portion having an increased diameter of the through channel is preferably provided at a region disposed with the ultrasonic horn, in the through channel.

Various configurations preferable in the first embodiment described above are also preferable configurations in the second embodiment and the third embodiment to be described below, unless otherwise noted.

Second Embodiment

Figure 4A:
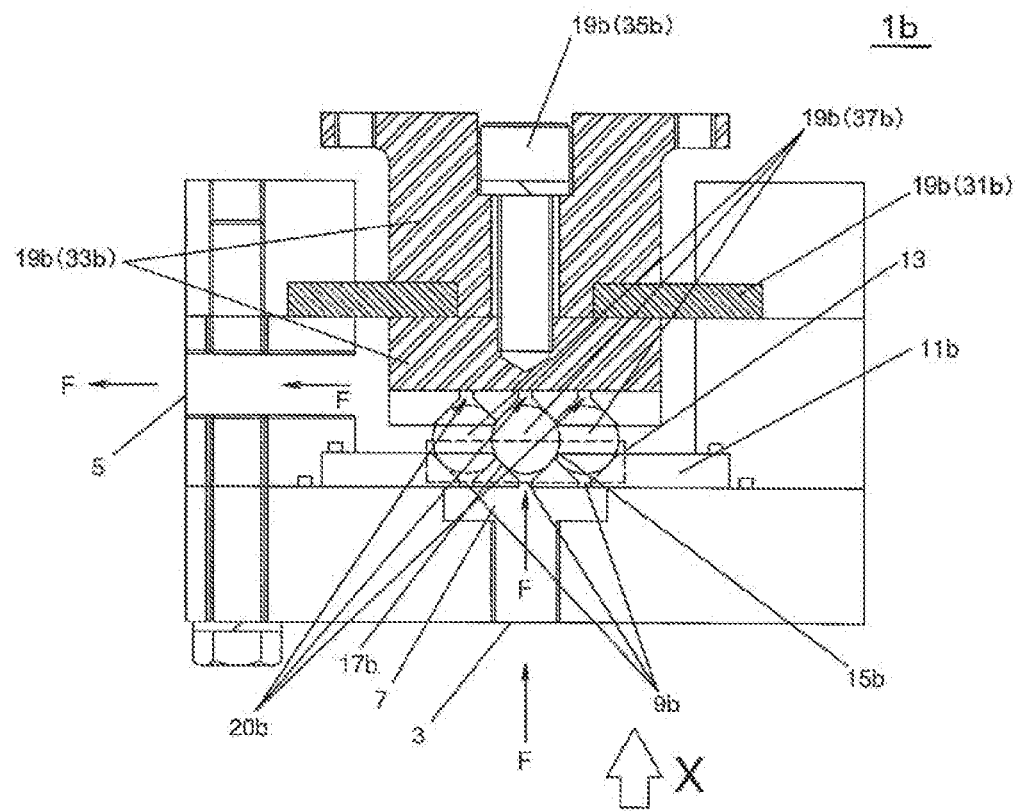
Figure 4B:
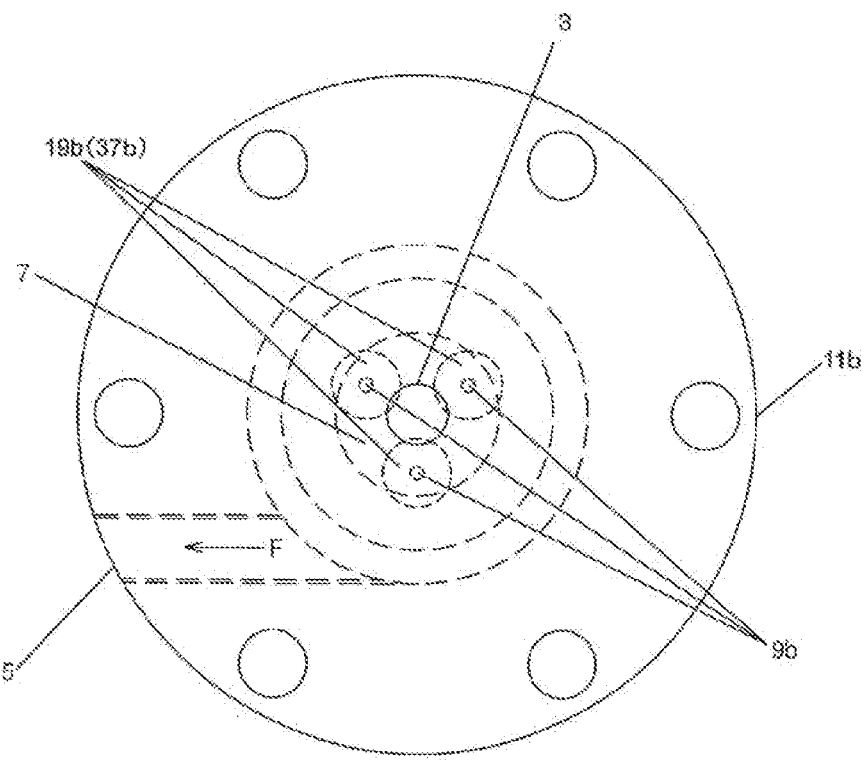

Here, a second embodiment of the wet disperser will be described. The second embodiment of the wet disperser is a wet disperser 1b as shown in FIGS. 4A and 4B. FIG. 4A is a vertical sectional view of the wet disperser, schematically showing the second embodiment of the wet disperser, in which a part of a through channel is seen through. FIG. 4B is a plane view of FIG. 4A seen from a direction of an arrow X, in which a part of the through channel is seen through. In FIGS. 4A and 4B, same components as those of the wet disperser of the first embodiment are denoted by the same reference numerals, and the description thereof may be omitted.

In the wet disperser 1b according to the second embodiment, two or more passing holes 9b are defined in a mixture-passing plate 11b. Then, a through channel 7 includes the dispersion part 13 having a vibration body 19b that comes into contact with each of the two or more passing holes 9b. In FIGS. 4A and 4B, in the wet disperser 1b of the second embodiment, three passing holes 9b are defined in the mixture-passing plate 11b, and the through channel 7 includes the dispersion part 13 having three vibration bodies 19b. When the wet disperser 1b has the two or more passing holes 9b, a treatment amount of the pre-dispersion treatment mixture can be increased. Note that, in FIGS. 4A and 4B, reference numeral 15b denotes an opening periphery (opening periphery of the passing hole), reference numeral 17b denotes the inside surface (inside surface defining the passing hole 9b), and reference numeral 20b denotes a holding recess for spherical vibration element. Further, reference numeral 31b denotes a rubber plate (vibration body), reference numeral 33b denotes a piston (vibration body), reference numeral 35b denotes a vibrator (vibration body), and reference numeral 37b denotes a spherical vibration element (vibration body).

Shapes of the two or more passing holes may be different from each other or may be all the same, but it is preferable that they are all the same from viewpoint of ease of manufacturing and the like. In addition, a shape and a number of the vibration body are not particularly limited as long as the vibration body comes into contact with each of the two or more passing holes. A same number of vibration bodies as the number of the two or more passing holes may be provided, or fewer vibration bodies than the two or more passing holes may be provided so as to come into contact with a part or all of the two or more passing holes. For example, while six passing holes may be defined in the mixture-passing plate, six vibration bodies that respectively come into contact with the six passing holes may be provided, three vibration bodies that come into contact with each of the two passing holes among the six passing holes may be provided, and single vibration body that comes into contact with all of the six passing holes may be provided. When two or more vibration bodies are provided, shapes of the two or more vibration bodies may be different from each other or may be all the same, but from viewpoint of ease of manufacturing, ease of vibration control, and the like, it is preferable that they are all the same.

When two or more vibration bodies are provided, amplitudes of the two or more vibration bodies may be all different or may be all the same, and the vibration frequencies of the two or more vibration bodies may also be all different or may be all the same.

Third Embodiment

Figure 8A:
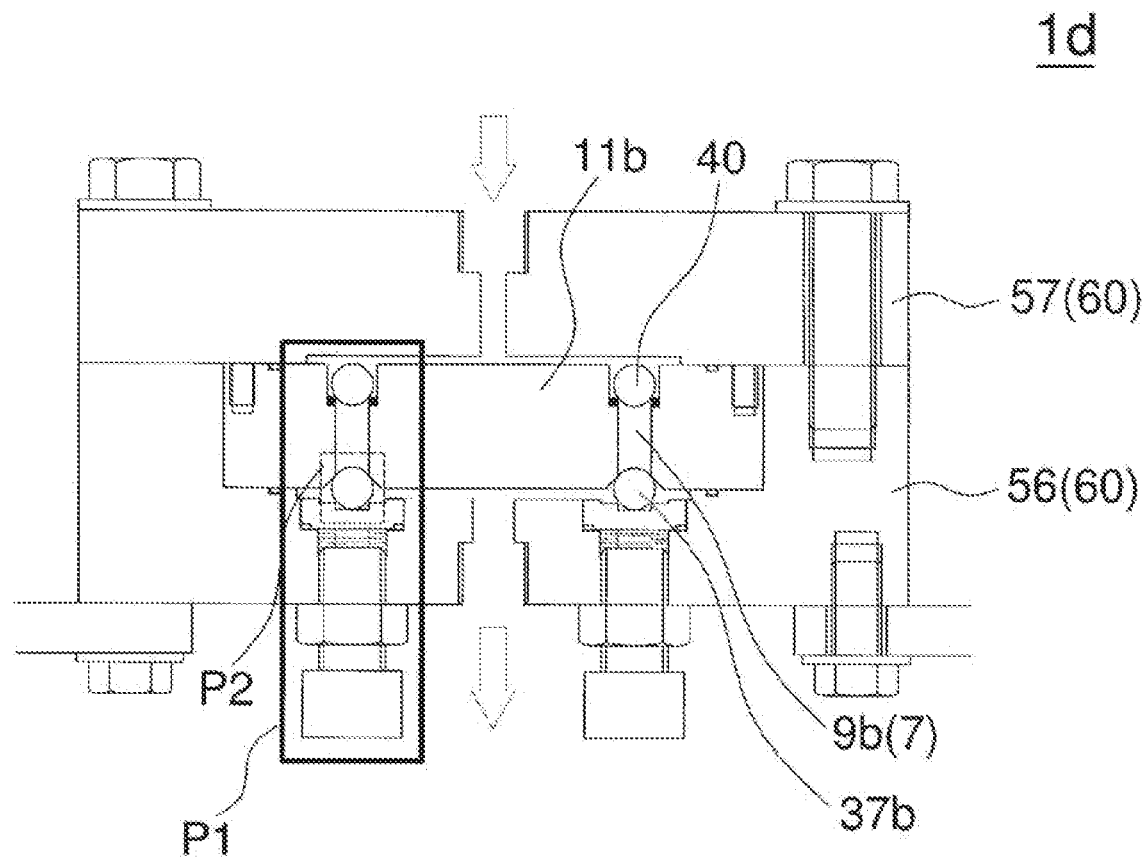
Figure 8B:
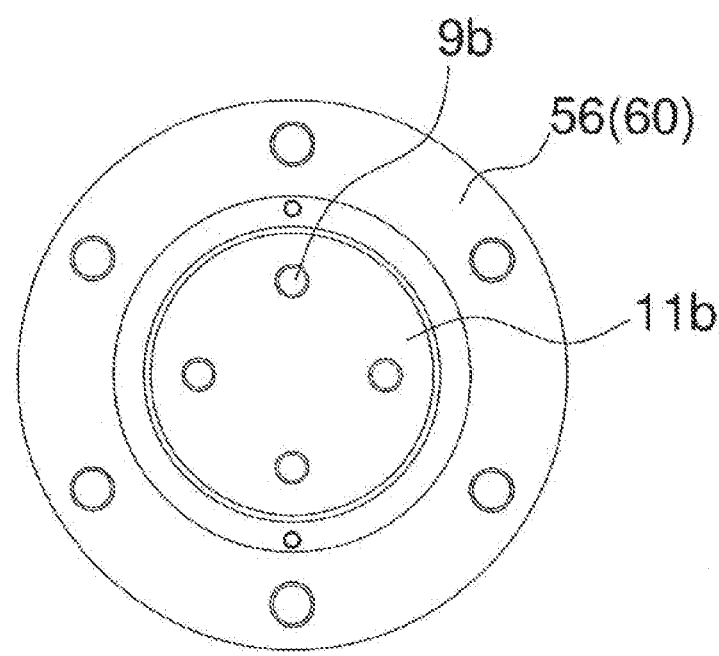

Next, a third embodiment of the wet disperser will be described. The third embodiment of the wet disperser is a wet disperser 1d as shown in FIGS. 8A and 8B. FIG. 8A is a vertical sectional view of the wet disperser, schematically showing the third embodiment of the wet disperser, in which a part of a through channel is seen through. FIG. 8B is a plane view of FIG. 8A as seen from a supplying direction of a pre-dispersion treatment mixture, in which an upper casing 57 is seen through. In FIGS. 8A and 8B, same components as those of the wet disperser of the first embodiment are denoted by the same reference numerals, and the description thereof may be omitted. Note that an arrow in FIG. 8A indicates a flow of fluid.

According to the wet disperser 1d according to the third embodiment, it is easy to adjust an average particle diameter of a resulting post-dispersion treatment mixture, as compared with the wet disperser of the first embodiment and the wet disperser of the second embodiment.

In FIGS. 8A and 8B, in the wet disperser 1d of the third embodiment, four passing holes 9b are defined in a mixture-passing plate (dispersion plate) 11b, and a through channel 7 includes a dispersion part having four vibration bodies (spherical vibration element 37b). The wet disperser 1d of the third embodiment includes a casing body 60 constituted of a lower casing 56 and the upper casing 57 placed on the lower casing 56. Inside the casing body 60, the mixture-passing plate 11b is disposed. The four passing holes 9b formed in the mixture-passing plate 11b are arranged such that, when the mixture-passing plate 11b is viewed from above, an angle formed by a straight line connecting a center of the mixture-passing plate 11b and each passing hole 9b (an angle formed by above-mentioned straight lines adjacent to each other in the clockwise direction) is 90 degrees.

In the lower casing 56, four through holes 62 (see FIG. 8C) are formed at positions corresponding to the four passing holes 9b of the mixture-passing plate 11b. In this through holes 62, there is disposed a ball holder 65 that is fitted with the through holes 62, and can freely move in an extending direction of the through hole 62. In the ball holder 65, a recess to hold the spherical vibration element 37b is formed on one surface side.

On the ball holder 65, the spherical vibration element 37b is placed, and the ball holder 65 is placed on a disc spring 66. By adopting such a configuration, when an external force is applied to the spherical vibration element 37b from thereabove, the spherical vibration element 37b is pushed down together with the ball holder 65. On the other hand, the ball holder 65 receives a force pushed back from the disc spring 66 (a force opposite to the external force from above). Therefore, with an occasional change in strength of the external force applied to the spherical vibration element 37b, the spherical vibration element 37b vibrates. That is, in the wet disperser 1d of the third embodiment, while the ball holder 65 and the spherical vibration element 37b are held by the disc spring 66, pulsation of the supplied pre-dispersion treatment mixture (pulsation caused by the liquid supply pump) causes the spherical vibration element 37b to vibrate up and down. Note that, while the disc spring is used in the present embodiment, there is no particular limitation as long as it can energize and hold the ball holder.

According to at least one embodiment, the spherical vibration element 37b approaches an opening of an outlet side (second surface side) of the passing hole 9b formed in the mixture-passing plate 11b so as to close the entire opening, or moves away from the opening. When the spherical vibration element 37b approaches the opening on the outlet side of the passing hole 9b, the spherical vibration element 37b may contact the entire opening to close the opening, or may not contact the entire opening. Moreover, the spherical vibration element 37b may contact the entire opening to close the opening every time the spherical vibration element 37b vibrates up and down, or may irregularly or regularly contact the opening to close the opening.

That is, as the spherical vibration element 37*b* approaches so as to close the entire opening or moves away from the opening, a complex flow field is generated, and particulates in a dispersing medium can be dispersed uniformly.

Figure 8C:
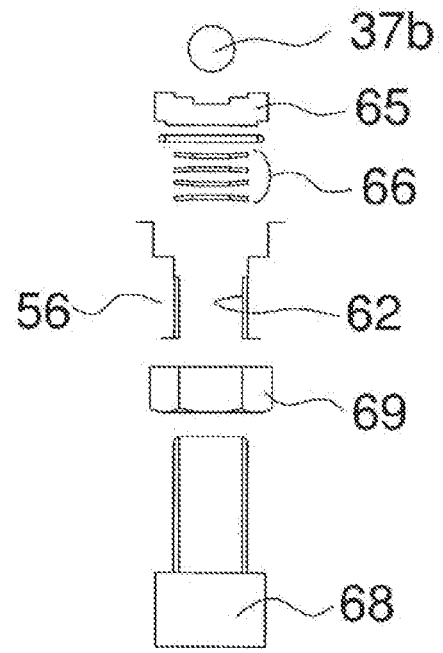
FIG. 8C is an explanatory view schematically showing a state where a region P1 shown in FIG. 8A is enlarged and disassembled.

The wet disperser 1*d* of the third embodiment has a spring mechanism as described above, and FIG. 8C shows a state where the above spring mechanism is disassembled. FIG. 8C shows an enlarged region P1 in FIG. 8A. As described above, the ball holder 65 is placed on the disc spring 66 in which a plurality of pieces are layered, and this disc spring 66 is placed at a tip end of a fixing bolt 68 inserted into a through hole formed in the lower casing 56. A position of the tip end of the fixing bolt 68 can be determined by adjusting a position of a nut 69. Adjusting the position of the tip of the fixing bolt 68 in this manner allows easy and fine adjustment of a positional relationship between the spherical vibration element 37*b* and the inside surface 17 of the passing hole 9*b*.

Further, the wet disperser 1*d* of the third embodiment has a preliminary dispersion vibration element 40. Having this preliminary dispersion vibration element 40 allows adjustment of a flow of the pre-dispersion treatment mixture, and more uniform dispersion of the particulates in the dispersing medium.

In the wet disperser of the third embodiment, the mixture-passing plate can be configured as follows. The mixture-passing plate has a first surface that is a surface on an upstream side of the through channel, and a second surface that is a surface on a downstream side of the through channel. As compared with an "opening area of the passing hole on the first surface" in the mixture-passing plate, an opening area of the passing hole may decrease stepwise in a part in a direction from the first surface toward the second surface, and the opening area of the passing hole may increase stepwise in a part in a direction from the first surface toward the second surface. FIGS. 9A to 9H show an enlarged region P2 disposed with the spherical vibration element 37*b* in FIG. 8A. A shape of the passing hole (through channel 7) can be a shape as shown in FIGS. 9A to 9H.

Figure 9A:
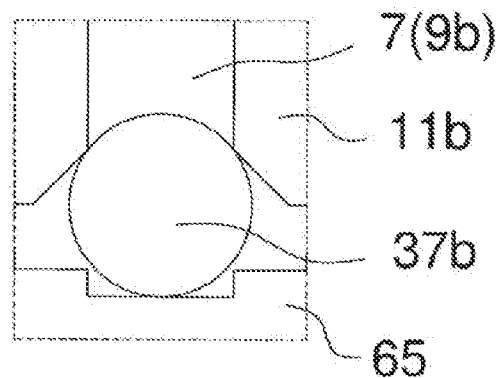
Figure 9B:
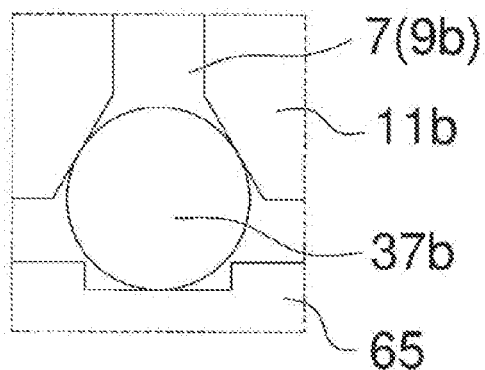
Figure 9C:
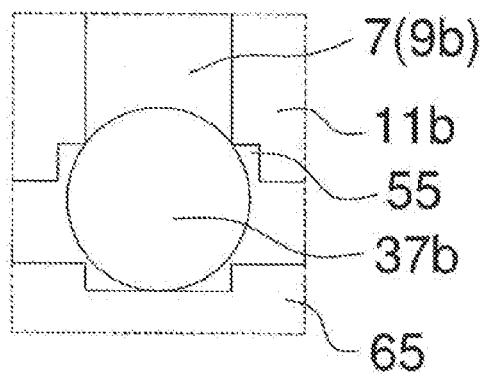
Figure 9D:
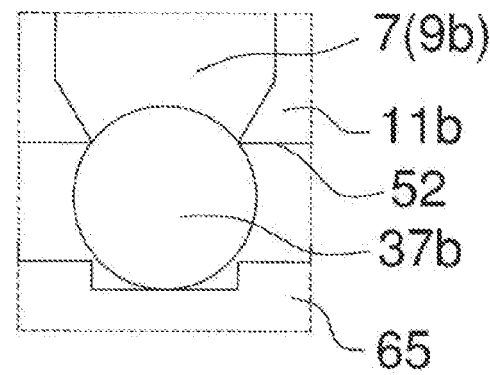
Figure 9E:
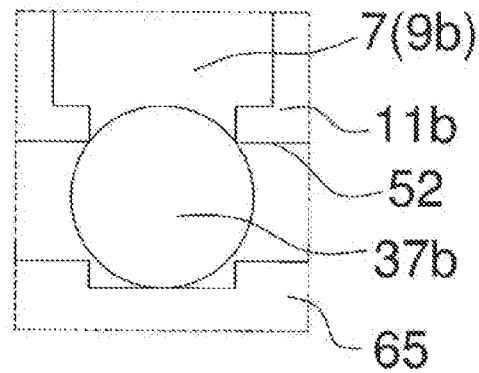
Figure 9F:
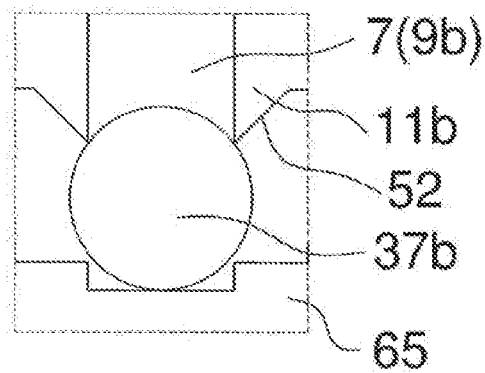
Figure 9G:
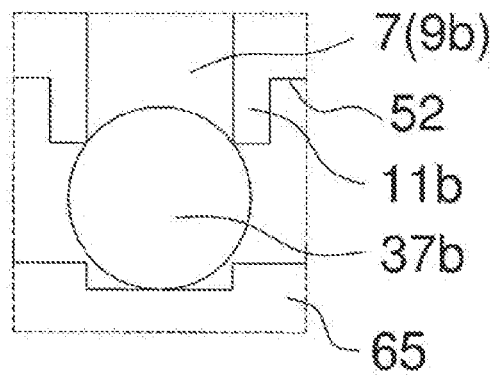
Figure 9H:
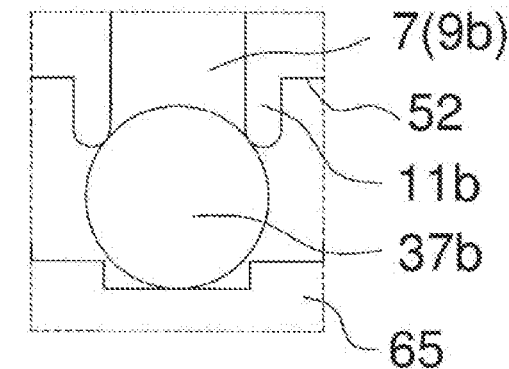

Further, the shape of the passing hole may be defined in "orifice/reverse-orifice shape" (see FIGS. 9A and 9B). "Orifice/reverse-orifice shape" indicates a shape in which the opening area of the passing hole gradually decreases in a part of the mixture-passing plate in a direction from the first surface toward the second surface, and the opening area of the passing hole gradually increases in a part in a direction from the first surface toward the second surface. Moreover, for example, a stepped portion 55 may be formed as shown in FIG. 9C.

Note that positions of the spherical vibration element 37*b* and the orifice-shaped passing hole 9*b* (inside surface 17) before starting of operation of the wet disperser 1*c* (before vibrating of the vibration body) are not particularly limited.

As shown in FIG. 9B, the spherical vibration element 37*b* and the orifice-shaped passing hole 9*b* can be brought into contact with each other at an intermediate position of the orifice-shaped passing hole 9*b*. By adopting such a positional relationship, it is difficult for scratches (grooves) to be formed in the vibration body when a liquid feeding pressure is increased. Note that a groove engraved on the vibration body causes a problem in that a deflection amount of the disc spring changes and a processing condition changes.

Shapes of the two or more passing holes may be different from each other or may be all the same, but it is preferable that they are all the same from viewpoint of ease of manufacturing and the like. In addition, a shape and a number of the vibration body are not particularly limited as long as the vibration body comes into contact with each of the two or more passing holes. A same number of vibration bodies as the number of the two or more passing holes may be provided, or fewer vibration bodies than the two or more passing holes may be provided so as to come into contact with a part or all of the two or more passing holes. For example, while six passing holes may be defined in the mixture-passing plate, six vibration bodies that respectively come into contact with the six passing holes may be provided, three vibration bodies that come into contact with each of the two passing holes among the six passing holes may be provided, and single vibration body that comes into contact with all of the six passing holes may be provided. When two or more vibration bodies are provided, shapes of the two or more vibration bodies may be different from each other or may be all the same, but from viewpoint of ease of manufacturing, ease of vibration control, and the like, it is preferable that they are all the same.

When two or more vibration bodies are provided, amplitudes of the two or more vibration bodies may be all different or may be all the same, and the vibration frequencies of the two or more vibration bodies may also be all different or may be all the same.

The wet disperser according to at least one embodiment can be enlarged by simply increasing the number of passing holes. That is, even when the number of the passing holes is various, such as 1, 10, 100, and the like, there is no difference in the quality of resulting treated products, so that risk of scale-up hardly occurs. Here, scale-up of equipment is a big problem for industrial machines. For example, a vacuum emulsifier, which is a representative emulsion manufacturing apparatus, requires sequential confirmation of operating conditions, to be scaled up, such as for an apparatus having a capacity of about 5 L for research and development, an apparatus of 50 to 100 L for small prototype production, and an apparatus of 500 to 1000 L for production. However, in the wet disperser according to at least one embodiment, the scale-up procedure as described above can be omitted, and it is possible to directly scale up from an apparatus for research and development having one passing hole, to an apparatus for production having 100 passing holes.

(Other Configurations)

FIG. 5 is an explanatory diagram schematically showing dispersion treatment using the wet disperser according to at least one embodiment. As shown in FIG. 5, in the wet disperser 1 according to at least one embodiment, there may be provided a reservoir 21 storing a pre-dispersion treatment mixture in a prestage of the inflow port 3, the reservoir 21 and the wet disperser 1 may be connected by a liquid supply pipe 23, and a liquid supply pump 24 or the like that supplies the pre-dispersion treatment mixture may be connected on the inflow port 3 side. Further, a mixture agitating tank (not shown) that agitates the pre-dispersion treatment mixture may be provided between the reservoir 21 and the inflow port 3, and there may be provided an air vent valve 25 to remove air from the pre-dispersion treatment mixture and a pressure gauge 27 or the like. Further, a recovery tank 29 that collects the post-dispersion treatment mixture may be provided in a poststage of the outflow port 5, the recovery tank 29 and the wet disperser 1 may be connected by the liquid supply pipe 23, and a suction pump (not shown) or the like may be connected on the outflow port 5 side. Furthermore, when an air vibrator of a piston vibration mechanism is used as a vibrator, which is capable of adjusting vibration by adjusting pressure of supply air, there may be connected an air feed pipe 39 to feed supply air to the vibrator, and an air regulating valve 41 to adjust pressure and the like.

In the wet disperser according to at least one embodiment, it is also possible to allow a mixture containing at least a dispersing medium and particulates to pass through one wet disperser for a plurality of times depending on a flocculation state of the particulates, for example. Depending on physical properties of the pre-dispersion treatment particulates and the dispersing medium, after being passed through the wet disperser according to at least one embodiment once (1 pass), the post-dispersion treatment mixture is further passed through the wet disperser according to at least one embodiment for a plurality of times (2 pass, 3 pass . . . n pass: n is positive integer), allowing control of a particle diameter and a particle diameter distribution of the particulates, and an increase in a dispersion degree. Further, in the wet disperser according to at least one embodiment, similar effects can also be obtained by connecting and using a plurality of wet dispersers in series. That is, the mixture passes through each of the wet dispersers connected in series in an order of a first wet disperser, a second wet disperser, and a third wet disperser. Between the wet dispersers connected in series, a reservoir or the like may be appropriately provided. Further, the wet disperser according to at least one embodiment can be designed in various ways, such as by arranging a plurality of the wet dispersers in parallel to treat a large amount of a mixture.

(Mixture)

In the wet disperser according to at least one embodiment, a "mixture" before the dispersion treatment is composed to include at least a dispersing medium and at least one kind of particulates selected from a group mainly consisting of a primary particle and an aggregate (note that the aggregate includes a solidified particulate weakly consolidated). That is, the "mixture" includes (1) a mixture containing at least the primary particle and the dispersing medium, (2) a mixture containing at least the aggregate and the dispersing medium, and (3) a mixture containing at least the primary particle and the aggregate, and the dispersing medium. Therefore, in this specification, "at least one kind of particulates selected from a group consisting of the primary particle and the aggregate" means any of (1') the primary particle, (2') the aggregate, and (3') the primary particle and the aggregate.

Moreover, in addition to the particulates and the dispersing medium, the above-mentioned "mixture" may contain well-known additives and the like used in dispersion treatment, for example, may contain a dispersion stabilizer and the like of the post-dispersion treatment particulates, such as surfactant and charge control agent.

Further, a ratio (volume ratio, mass ratio, and the like) of the particulates, contained in the dispersing medium, to be dispersed by using the wet disperser according to at least one embodiment is not particularly limited. The ratio is appropriately determined according to a particle diameter of the pre-dispersion treatment particulates, a particle diameter and a particle diameter distribution of the post-dispersion treatment particulates to be obtained, and an application of the post-dispersion treatment particulates, and the like.

Note that a median diameter according to at least one embodiment is a value measured by a laser diffraction/scattering type particle diameter distribution measuring apparatus LA-960 manufactured by Horiba, Ltd.

(Dispersoid)

A material of the pre-dispersion treatment particulates contained in the mixture is not particularly limited. Any known dispersoid used for dispersion treatment may also be used as pre-dispersion treatment particulates, and for example, silica, zirconia, alumina, titania, zinc oxide, and the like can be used. In addition, with the wet disperser according to at least one embodiment, the material of the particulates is not changed between the particulates before the dispersion treatment and the particulates after the dispersion treatment. That is, the particulates before the dispersion treatment and the particulates after the dispersion treatment differ only in a median diameter, a fiber diameter, and a fiber length, while an element composing the particulates does not react chemically.

(Dispersing Medium)

The dispersing medium contained in the mixture is not particularly limited. Any known dispersing medium used for dispersion treatment may also be used. For example, water, ethyl alcohol, methyl alcohol, hexane, benzene, toluene, methylene chloride, and the like can be used.

The mixture can be obtained by mixing particulates serving as a dispersoid as described above, with a dispersing medium at a predetermined mixing ratio. To the mixture, a dispersion stabilizer or the like for the post-dispersion treatment particulates, such as a surfactant, a charge control agent may be added. The mixture containing at least the pre-dispersion treatment particulates and the dispersing medium obtained in this way is supplied to the wet disperser according to at least one embodiment to be subjected, to dispersion treatment.

Hereinafter, embodiments will be described more specifically with reference to Examples, but the embodiments are not limited by these Examples.

Example 1

Using the wet disperser 1 as shown in FIGS. 1A to 1C and using a sample (pre-dispersion treatment mixture) in which aggregated particles (fumed silica in an amorphous state) are preliminarily mixed in a dispersing medium, experiment was conducted to check a dispersion state of a mixture in the dispersing medium before the dispersion treatment and after the dispersion treatment.

Specifically, as shown in FIG. 5, in order to allow the pre-dispersion treatment mixture to be supplied from the reservoir 21 storing the sample (pre-dispersion treatment mixture) to the wet disperser 1, the liquid supply pump 24 was arranged between the reservoir 21 and the wet disperser 1 that are connected by the liquid supply pipe 23.

As the liquid supply pump, 8843-S type manufactured by L. TEX Corporation was used. A liquid supply amount of the mixture (mixed liquid) of the liquid supply pump was set to 22.50 kg/hour, and a liquid supply pipe having a diameter of 4 mm was used. Further, a vibration frequency of the vibration body was set to 55 Hz.

As the wet disperser, a dispersion model (wet disperser 1) manufactured by Ohkawara Kakohki Co., Ltd. as shown in FIGS. 1A to 1C was used. The wet disperser includes a through channel and a mixture-passing plate, and the through channel includes, on a downstream side of the through channel from a position provided with the mixture-passing plate, a dispersion part having a vibration body provided such that vibration causes at least a part of the vibration body to come into contact with at least a part of an opening periphery of a passing hole, and an inside surface defining the passing hole of the mixture-passing plate. In addition, the vibration body had a spherical vibration element.

As a sample, REOLOSIL QS-102 manufactured by Tokuyama Corporation was used as aggregated particles before dispersion treatment, and pure water was used as a dispersing medium. The sample was prepared by stirring pure water with a spatula so as to contain the aggregated particles (fumed silica in an amorphous state) of 5 mass % in pure water, to cause the aggregated particles (fumed silica in an amorphous state) to be suspended. Next, using HOMOMIXER MARK II model 2.5 manufactured by Primix Corporation, stirring was carried out for 1 minute at a rotation speed of 12000 rpm.

Figure 6:
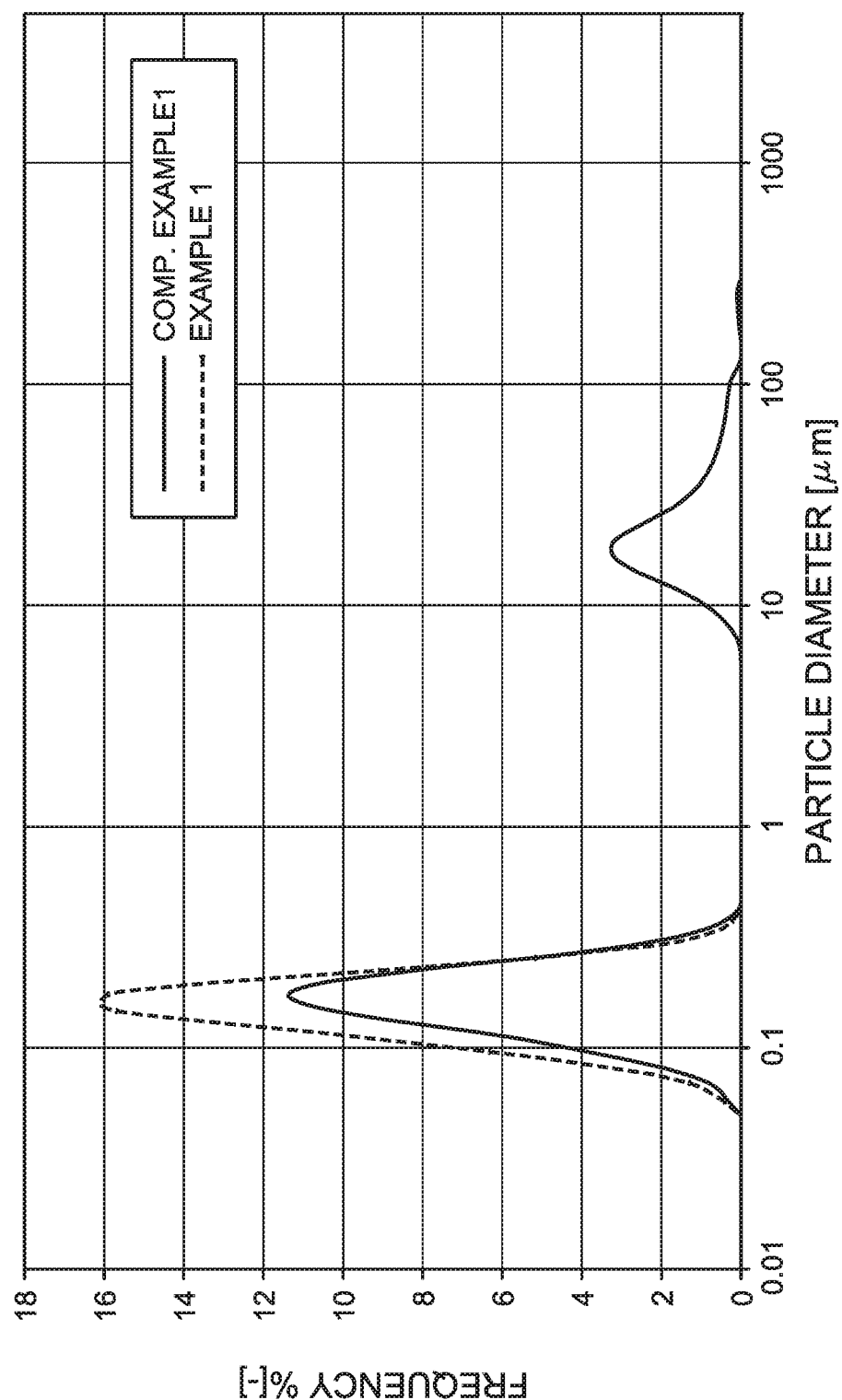
FIG. 6 is a graph showing a particle diameter distribution of particulates after dispersion treatment with the wet disperser according to an embodiment, and a particle diameter distribution of particulates without dispersion treatment with the wet disperser according to an embodiment.

By the wet disperser configured as described above, for the mixture before the dispersion treatment and the mixture after the dispersion treatment, a particle diameter and a particle diameter distribution of the particulates being dispersed in the dispersing medium were measured using a laser diffraction/scattering type particle diameter distribution measuring apparatus LA-960 manufactured by Horiba, Ltd. Note that a particle diameter measurement range of the post-dispersion treatment particulates was 0.01 to 5000 μm, and a capacity of a batch cell was 15 ml. The particle diameter of the post-dispersion treatment particulates was determined by Mie scattering theory. For the particulates after the dispersion treatment, evaluation was made for the particulates after 1-pass, which has been passed through the wet disperser once. Further, from the particle diameter distribution of the measured particulates, a median diameter of the measured particulates, 90% cumulative diameter value $D_{90}$, and 10% cumulative diameter value $D_{10}$ were determined. The median diameter of the particulates after dispersion treatment with the wet disperser of Example 1 was 144 nm, 90% cumulative diameter value $D_{90}$ was 216 nm, and 10% cumulative diameter value $D_{10}$ was 91 nm. Further, $D_{90}/D_{10}$ was determined, which is a value obtained by dividing 90% cumulative diameter value $D_{90}$ by 10% cumulative diameter value $D_{10}$. $D_{90}/D_{10}$ of the particulates after dispersion treatment with the wet disperser of Example 1 was 2.37. Note that, as the median diameter of the particulates is smaller and the value of $D_{90}/D_{10}$ is smaller, a dispersion degree of the particulates after dispersion treatment is higher. A result is shown in FIG. 6 and Table 1. Note that, in FIG. 6, the particle diameter distribution of the particulates of Example 1 is indicated by a dashed line.

TABLE 1

|  | Vibration body | Mixture-passing plate | Median diameter | $D_{90}/D_{10}$ |
|---|---|---|---|---|
| Example 1 | 1 | Present | 144 nm | 2.37 |
| Comparative Example 1 | — | — | 181 nm | 214.20 |
| Example 2    1 pass | 2 | Present | 1053 nm | 2.24 |
| 5 pass |  |  | 609 nm | 2.54 |
| 10 pass |  |  | 422 nm | 2.57 |
| 40 pass |  |  | 323 nm | 2.40 |

Example 2

Experiment was conducted to confirm to obtain a uniform emulsion (post-dispersion treatment mixture) by performing emulsification dispersion of rapeseed oil in water by using the wet disperser 1 as shown in FIG. 3.

Specifically, as shown in FIG. 5, in order to allow the pre-dispersion treatment mixture to be supplied from the reservoir 21 storing the sample (pre-dispersion treatment mixture) to the wet disperser 1, the liquid supply pump 24 was arranged between the reservoir 21 and the wet disperser 1 that are connected by the liquid supply pipe 23.

As the liquid supply pump, 8843-S type manufactured by L. TEX Corporation was used. A liquid supply amount of the mixture (mixed solution) of the liquid supply pump was set to 18 kg/hour (300 mL/min), a liquid feeding pressure was set to 15 MPa, and a liquid supply pipe having a diameter of 4 mm was used. Further, a vibration frequency of the vibration body was 3 Hz. Moreover, a liquid temperature of the sample was 80° C.

As the wet disperser, a dispersion model (wet disperser 1) manufactured by Ohkawara Kakohki Co., Ltd. as shown in FIG. 3 was used. The wet disperser includes a through channel and a mixture-passing plate, and the through channel includes, on a downstream side of the through channel from a position provided with the mixture-passing plate, a dispersion part having a vibration body provided such that vibration causes at least a part of the vibration body to come into contact with at least a part of an opening periphery of a passing hole, and an inside surface defining the passing hole of the mixture-passing plate. In addition, the vibration body had a spherical vibration element.

As a sample, there was used a rapeseed oil: sodium lauryl sulfate 0.01 mol/L aqueous solution (5:95), and this aqueous solution was used without pretreatment with a homomixer.

By the wet disperser configured as described above, for the mixture before the dispersion treatment and the mixture after the dispersion treatment, a particle diameter and a particle diameter distribution of the particulates being dispersed in the dispersing medium were measured using a laser diffraction/scattering type particle diameter distribution measuring apparatus LA-960 manufactured by Horiba, Ltd., similarly to the Example 1.

Figure 10:
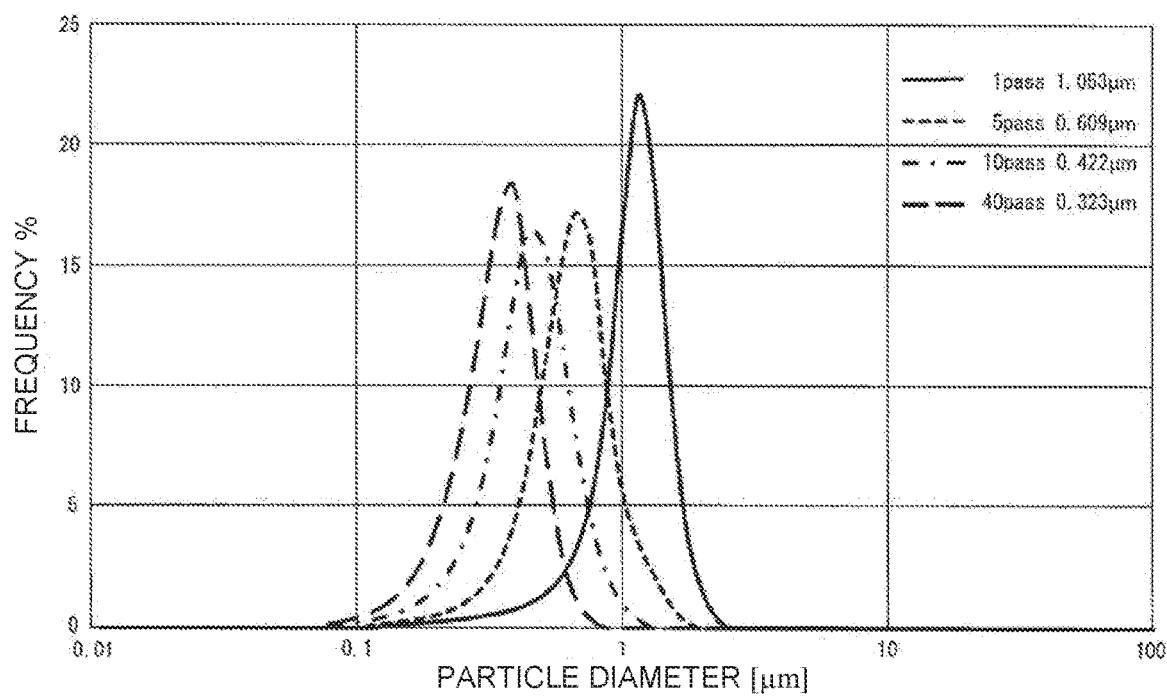
FIG. 10 is a graph showing a particle diameter distribution of emulsion particles subjected to emulsification treatment with the wet disperser according to at least one embodiment.

Note that FIG. 10 shows a particle diameter distribution of the particulates once subjected to the dispersion treatment in Example 2, and each particle diameter distribution of the particulates passed through the wet disperser for a plurality of times, such as 5, 10, 40 times, to be subjected to the dispersion treatment. From the result of FIG. 10, it is understood that a uniform emulsion (post-dispersion treatment mixture) can be obtained. In addition, an average particle diameter of the particulates can be sequentially reduced according to the number of times of passing through the wet disperser. Note that, in Table 1, "2" of "Vibration body" in Example 2 indicates that a preliminary vibration body is included.

Comparative Example 1

Evaluation was conducted similarly to Example 1, for a mixture (sample) without dispersion treatment with the wet disperser. A median diameter of the particulates without dispersion treatment with the wet disperser was 181 nm, 90% cumulative diameter value $D_{90}$ was 21.848 μm, 10% cumulative diameter value $D_{10}$ was 102 nm, and $D_{90}/D_{10}$ was 214.20. A result is shown in FIG. 6 and Table 1. Note that, in FIG. 6, the particle diameter distribution of the particulates of Comparative Example 1 is indicated by a solid line.

(Result)

The median diameter of the post-dispersion treatment particulates subjected to the dispersion treatment with the wet disperser according to at least one embodiment was 0.8 times smaller than the median diameter of the pre-dispersion treatment particulates. Further, the value of $D_{90}/D_{10}$ of the post-dispersion treatment particulates dispersed by the wet disperser according to at least one embodiment was 90 times larger than the value of $D_{90}/D_{10}$ of the pre-dispersion treatment particulates. Thus, a dispersion degree of the post-dispersion treatment particulates subjected to the dispersion treatment with the wet disperser according to at least one embodiment was better than that of the post-dispersion treatment particulates without dispersion treatment with the wet disperser according to at least one embodiment.

DISCUSSION

From the above results, it was found that the wet disperser according to at least one embodiment can disperse pre-dispersion treatment particulates in a dispersing medium in a state of high dispersion degree, as post-dispersion treatment particulates having a median diameter of 1 to 500 nm.

INDUSTRIAL APPLICABILITY

Embodiments can be used for dispersing various kinds of particulates, as the wet disperser that is almost free from contamination (mixing of a foreign matter), can uniformly disperse particulates in a short time, and can be operated while saving energy and space.

DESCRIPTION OF REFERENCE NUMERALS 1, 1b, 1c, 1d: wet disperser, 3: inflow port, 5: outflow port, 7: through channel, 9, 9b: passing hole, 11, 11b: mixture-passing plate, 13: dispersion part, 15, 15b: opening periphery (opening periphery of passing hole), 17, 17b: inside surface (inside surface defining passing hole), 19, 19b: vibration body, 20, 20b: holding recess for spherical vibration element, 21: reservoir, 23: liquid supply pipe, 24: liquid supply pump, 25: air vent valve, 27: pressure gauge, 29: recovery tank, 31, 31b: rubber plate, 33, 33b: piston, 35, 35b: vibrator, 37, 37b: spherical vibration element, 38: vibration element, 39: air feed pipe, 40: preliminary dispersion vibration element, 41: air regulating valve, 51: first surface, 52: second surface, 55: stepped portion, 56: lower casing, 57: upper casing, 60: casing body, 62: through hole, 65: ball holder, 66: disc spring, 68: fixing bolt, 69: nut, R1: first surface of rubber plate, R2: second surface of rubber plate, F: arrow (flowing direction of mixture).

The invention claimed is:

1. A wet disperser configured to disperse particulates in a mixture containing at least a dispersing medium and at least one kind of particulates selected from a group consisting of a primary particle and an aggregate, the wet disperser comprising:
a through channel comprising an inflow port and an outflow port configured to serve as a through channel of the mixture and configured to extend from the inflow port to the outflow port;
a mixture-passing plate provided in a middle of the through channel and comprising at least one passing hole arranged at an inlet of the mixture-passing plate;
a dispersion part arranged downstream of the inlet of the mixture-passing plate; and
a vibration body comprising a spherical vibration element seated in a recess of the vibration body, wherein the vibration body is configured to vibrate such that the spherical vibration element seated in the recess of the vibration body comes into contact with at least a part of an opening periphery of the at least one passing hole to close off the at least one passing hole and to disperse the particulates in the mixture out the outflow port.

2. The wet disperser according to claim 1, wherein the mixture-passing plate comprises a first surface having a small opening area of the passing hole and a second surface having an opening area of the passing hole larger than the opening area of the passing hole on the first surface; and
wherein the second surface side of the mixture-passing plate is arranged so as to be positioned on a side provided with the vibration body.

3. The wet disperser according to claim 2, wherein the opening area of the passing hole is configured to gradually increase in at least a part in a direction from the first surface toward the second surface.

4. The wet disperser according to claim 2, wherein vibration causes the vibration body to come into contact with at least a part of the inside surface.

5. The wet disperser according to claim 4, wherein a part of the vibration body is a curved surface, and vibration causes the curved surface to come into contact with at least a part of the inside surface.

6. The wet disperser according to claim 1, wherein the primary particle includes a particulate matter or a fibrous substance.

7. The wet disperser according to claim 1, wherein the particulates are dispersed as nanoparticles having a median diameter of 1 to 500 nm in a mixture after dispersion treatment.

8. The wet disperser according to claim 1, wherein the particulates are dispersed in a mixture after dispersion treatment as post-dispersion treatment particulates having a median diameter of 500 nm to 10 μm, or the particulates are dispersed in a mixture after dispersion treatment as nanofibers having a fiber diameter of 1 to 100 nm and a length of 100 times or more of the fiber diameter.

9. The wet disperser according to claim 1, wherein amplitude of the vibration body is 1 μm to 10 mm.

10. The wet disperser according to claim 1, wherein a vibration frequency of the vibration body is 0.1 to 10000 Hz.

11. The wet disperser according to claim 1, further comprising, in a part of the through channel, an ultrasonic wave generator on a downstream side from a part disposed with the dispersion part, and a frequency of the ultrasonic wave generator is 20 kHz to 10 MHz.

* * * * *